US012675233B2

(12) United States Patent
Tan et al.

(10) Patent No.: US 12,675,233 B2
(45) Date of Patent: Jul. 7, 2026

(54) REQUEST PROCESSING METHOD, APPARATUS, AND SYSTEM

(71) Applicant: Huawei Technologies Co., Ltd., Shenzhen (CN)

(72) Inventors: Kun Tan, Beijing (CN); Shui Cao, Shanghai (CN); Changchun Ouyang, Shanghai (CN); Yusu Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/640,781

(22) Filed: Apr. 19, 2024

(65) Prior Publication Data

US 2024/0264768 A1 Aug. 8, 2024

Related U.S. Application Data

(63) Continuation of application No. PCT/CN2022/126038, filed on Oct. 19, 2022.

(30) Foreign Application Priority Data

Oct. 21, 2021 (CN) .......................... 202111229546.0

(51) Int. Cl.
G06F 3/06 (2006.01)
G06F 12/06 (2006.01)
(52) U.S. Cl.
CPC ............ G06F 3/0655 (2013.01); G06F 3/061 (2013.01); G06F 3/0673 (2013.01); G06F 12/06 (2013.01)

(58) Field of Classification Search
CPC ..... G06F 3/061; G06F 12/1009; G06F 13/404
See application file for complete search history.

(56) References Cited

U.S. PATENT DOCUMENTS

| | | | |
|---|---|---|---|
| 5,117,350 A | 5/1992 | Parrish et al. | |
| 2009/0089537 A1* | 4/2009 | Vick ................... | G06F 12/0284 |
| | | | 711/E12.09 |
| 2015/0012679 A1* | 1/2015 | Davis ................. | G06F 13/4022 |
| | | | 710/110 |
| 2019/0018785 A1* | 1/2019 | Beard ................. | G06F 12/0653 |
| 2020/0371955 A1* | 11/2020 | Goodacre ........... | G06F 12/0811 |
| 2022/0137816 A1* | 5/2022 | Hormuth .............. | G06F 3/0605 |
| | | | 711/154 |

FOREIGN PATENT DOCUMENTS

| | | |
|---|---|---|
| CN | 103312720 A | 9/2013 |
| CN | 103744799 A | 4/2014 |
| CN | 110869913 A | 3/2020 |
| CN | 112395220 A | 2/2021 |

* cited by examiner

*Primary Examiner* — Edward J Dudek, Jr.
(74) *Attorney, Agent, or Firm* — Conley Rose, P.C.

(57) ABSTRACT

A first node obtains a corresponding physical address based on a first virtual address in a first request. The first request may be sent by an application in the first node, and is used to request to read data of a second node or request to write data to the second node. Then, the first node sends a second request corresponding to the first request to the second node based on a first mapping relationship. Because the bus address indicates a virtual address corresponding to an instance of the second node, when the virtual address may be accessed by the first node based on the first request, the virtual address may be accessed by the second node, or may be accessed by another node based on a request, to implement address sharing in data access.

20 Claims, 8 Drawing Sheets

Apparatus 600

Apparatus 700

REQUEST PROCESSING METHOD, APPARATUS, AND SYSTEM

CROSS-REFERENCE TO RELATED APPLICATIONS

This is a continuation of International Patent Application No. PCT/CN2022/126038 filed on Oct. 19, 2022, which claims priority to Chinese Patent Application No. 202111229546.0 filed on Oct. 21, 2021. The disclosures of the aforementioned applications are hereby incorporated by reference in their entireties.

TECHNICAL FIELD

This disclosure relates to the field of communication technologies, and in particular, to a method, an apparatus, and a system for accessing a memory of a remote device.

BACKGROUND

With development of technologies, a distributed application is more widely applied. The distributed application means that an application distributed on different physical nodes. The physical node is usually a computer. To be specific, when the distributed application executes a task or a service, data needs to be exchanged between a plurality of physical nodes. In this process, the data is usually stored in a storage of the physical node. When the data needs to be used, the data is loaded by a processor of the physical node into a memory. In this way, remote memory access (to be specific, a computer (a local device) accesses a memory of another computer (a remote device) to operate data in the memory) is a very basic function. In essence of the technologies, accessing data is to access a storage medium related to the data, and includes at least two scenarios: reading the data and writing the data.

Usually, a memory of the local device is accessed through a bus, and the memory of the remote device is accessed through a network. Semantic rules of accessing the memory of the local device through the bus and accessing the memory of the remote device through the network are different. A device needs to access a memory of another device based on a network communication technology, for example, a Transmission Control Protocol/Internet Protocol (TCP/IP) or remote direct memory access (RDMA). Consequently, a delay of accessing the memory of the remote device is long.

To reduce a delay generated based on the network communication technology, semantics used to access the memory of the local device may also be used to access the memory of the remote device. In this case, an on-chip interconnect (OCI) technology needs to be used. Essence of the technologies is to use a segment of memory of the remote device as the memory of the local device for management and use. Therefore, once a segment of memory of a device is allocated to another device, a device other than the other device cannot access the segment of memory. In other words, the memory of the remote device cannot be "shared". An application scenario of this manner is greatly limited, and a complex memory access requirement cannot be met.

In conclusion, according to an existing method for accessing a memory of a remote device, a plurality of types of performance (for example, a delay and access permission sharing) of data transmission cannot be considered, and therefore, transmission performance is poor.

SUMMARY

Embodiments of this disclosure provide a method, an apparatus, and a system for accessing a memory of a remote device, so that a plurality of types of performance, for example, a delay and access permission sharing, of data transmission can be considered, to improve data transmission efficiency.

To achieve the foregoing objective, the following technical solutions are used in embodiments of this disclosure:

According to a first aspect, an embodiment of this disclosure provides a request processing method. The method is performed by a first node described below. The first node is a device that sends a request, a component (for example, a chip) of the device, or another component that supports a function of sending a request. The first node obtains a corresponding physical address based on a first virtual address. The first virtual address is a virtual address in a first request, and the first request is used to request to read data of a second node or request to write data to a second node. The first node sends a second request to the second node based on a first mapping relationship. The first mapping relationship is a mapping relationship between the physical address and a bus address, the second request corresponds to the first request, the second request includes the bus address, and the bus address indicates a virtual address corresponding to an instance of the second node.

In this disclosure, the word "bus" is not only used to indicate a transmission path or a data link of a signal and data on a same device or a same node, but also can indicate a transmission path or a data link of a signal and data between different nodes. It can be considered that, the bus in this disclosure may cover functions of two words "bus" and "network" in other technologies. In other words, a use scenario of the word "bus" is extended in this disclosure. A purpose is that an instruction (for example, a read instruction and a write instruction) used to access data of a local device can be extended to a scenario in which data of a remote device is accessed. Therefore, data access of the local device and data access of the remote device do not need to be distinguished in terms of a request format and a processing procedure. In other words, a request and data are packaged based on a remote network communication protocol when the remote device is accessed. In this disclosure, a bus used for communication between different nodes is also referred to as a high-performance interconnect bus (HPIB), to distinguish the bus and a bus in another technology.

Therefore, the bus address is also a new concept proposed in this disclosure. The bus address may indicate a virtual address corresponding to an instance of another node (that is, the remote device, for example, the second node), and is carried in a data access request (for example, the second node) to be sent to another node. In some scenarios, each bus address is globally unique, and "global" may be an entire network, or may be a range defined in the network, for example, a domain, a building, an industrial park, or a city in the network. Setting a globally unique bus address may be undoubtedly indicating a virtual address of an instance in "global", to simplify address translation and addressing, and improve data access efficiency.

It should be understood that, in the foregoing process, a storage medium of the second node may be accessed, to read data or write data. The storage medium is a medium that may be used by the instance of the second node, for example, a memory, a cache, and some other storage devices.

It should be understood that, the virtual address corresponding to the instance, which is also briefly referred to as the virtual address of the instance, is a virtual address in a virtual address space allocated to the instance by an operating system (OS) in which the instance is located. The virtual address space is a segment of virtual address or several segments of virtual addresses. Based on the virtual address, the instance may use a physical address corresponding to the virtual address, which is also briefly referred to as a physical address of the instance, in other words, use a real hardware resource. In the foregoing method, a process of obtaining the corresponding physical address based on the first virtual address is a process in which an instance of the first node performs address translation.

It should be understood that, accessing the storage medium of the second node is reading the data in the second node or writing the data into the second node. Certainly, both reading and writing may be performed. To be specific, data at a location in the second node is requested to be read, and data at another location in the second node is requested to be written. In a specific implementation, one second request may include both a read instruction and a write instruction. The storage medium of the second node may be, for example, the memory of the second node, or another device with a data storage function in the second node.

It should be understood that, when the first request is used to write data to the second node, at least the second request to be sent to the second node needs to carry the data to be written. The data may be delivered by an application in the first node, or may be obtained by an OS of the first node from a storage medium of the first node. Data in the second request may be from the first request, or may be added in a process of obtaining the second request based on the first request.

In conclusion, the first request may be triggered by a service, an application, or an operation of a user who uses the first node that runs on the first node, and carries the first virtual address. The first node obtains the second request corresponding to the first request based on the physical address corresponding to the first virtual address and the first mapping relationship. Because the bus address corresponds to an instance of the second node, the first node may send the second request to the second node. In other words, the second request is to change at least the physical address in the first request to the corresponding bus address. The bus address indicates the virtual address corresponding to the instance of the second node, rather than the physical address of the instance.

It should be understood that, a physical address of a node can be managed or accessed by only one node. Because the bus address is a virtual address, when the virtual address may be accessed by the first node based on the first request, the virtual address may be accessed by the second node, or may be accessed by another node based on a request. In other words, address sharing may be implemented in data access. In addition, the bus address is used, and semantics of network access does not need to be used. Compared with an existing network communication technology, in this disclosure, a delay of accessing data of the remote device can be reduced, and an access rate can be improved. In other words, performance in two aspects of a delay and access permission sharing of data transmission can be considered.

In an implementation, the first node includes a bus end point, and the bus end point of the first node is configured to communicate with the second node based on the first mapping relationship.

By using the bus end point, the first node may access a bus for communication between nodes to access data of another node. In this disclosure, the bus is also referred to as node, "high-performance bus", and may be understood as a physical line used for communication between nodes. The bus end point is configured to use the first mapping relationship and a first mapping table in which the first mapping relationship is located, but does not edit or manage the first mapping relationship (first mapping table), that is, does not change, in a use process, information recorded in the first mapping relationship (first mapping table). A driver of the bus end point manages the first mapping relationship table, and may manage, for example, initialize, assign, modify, and update, an entry in the first mapping relationship table. It should be understood that, the driver of the bus end point is a software module, and is installed and run in an OS of the first node, so that the OS of the first node uses the bus end point.

Correspondingly, the physical address is an address in a physical address space corresponding to the bus end point of the first node. This means that the physical address space (the physical address space is a segment of physical address) in which the physical address is located belongs to the bus end point of the first node, that is, is managed by the bus end point of the first node. In other words, the bus end point of the first node has a right to use the physical address space in which the physical address is located. In other technologies, a physical address of an instance is usually a physical address space corresponding to a dynamic random-access memory (DRAM) in a node, or a physical address space of an input/output (I/O) device, and is managed by the OS. A reason is that the instance is started by the OS, and is naturally allocated with a physical address that may be managed by the OS. In this method, there is a different, and the physical address of the instance belongs to the physical address space corresponding to the bus end point. In other words, the virtual address carried in the first request can be processed by using the bus end point and sent to another node only when the virtual address carried in the first request can be mapped onto the physical address space corresponding to the bus end point. The physical address space may be negotiated by a basic input/output system (BIOS) with the foregoing devices before the OS is installed, to determine the physical address space corresponding to the devices. After the OS runs, the BIOS reports the physical address space to the OS.

In an implementation, the bus address includes an identifier of a bus end point of the second node and a second virtual address, the bus end point of the second node is configured to communicate with the first node, and the second virtual address is related to the instance. There is a mapping relationship between the second virtual address and a physical address in a physical address space of the instance, and one bus address needs to be uniquely mapped onto a physical address or a segment of physical address, to implement address mapping described in this disclosure. An implementation of the second virtual address is not limited in this disclosure. In an implementation, the second virtual address is an address in the virtual address space of the instance (in this manner, the bus address usually further includes an identifier of the instance). In another implementation, an assignment value of the second virtual address is customized. For example, all second virtual addresses are different, and correspond to different physical addresses. In addition, the second virtual address is related to the instance, but the virtual address corresponding to the instance of the second node can be indicated only when the second virtual address and other information of the bus address, for example, an identifier of the bus end point of the second node are both used.

For ease of management, the identifier of the bus end point and a plurality of customized second virtual addresses are all unique in a domain (an entire domain or a domain including one or more local domains). For example, a building, a cell, a data center, or a city may be a domain.

In other words, the second node also needs to include the bus end point, to complete the foregoing method. The data processing method is completed by using the bus end point of the node. In this way, the request may be sent to the second node based on the bus address, and the second node may also execute the request based on the bus address. In addition, the first node and the second node each may include a plurality of bus end points.

In another implementation, the bus address further includes an identifier of the instance. It can be learned that a virtual address of one instance may be directly indicated by one virtual address. For example, the virtual address is a globally unique virtual address in the second node. The virtual address of the instance may also be indicated in a form of the identifier of the instance plus the virtual address. In this case, values of virtual addresses corresponding to different instances of the second node may be the same.

In some implementations, the identifier of the instance further indicates a virtual address space corresponding to the instance. In other words, an implementation of the identifier of the instance is not limited in this disclosure, provided that different instances of a node can be distinguished. In the node, different instances correspond to different virtual address spaces. Therefore, a name or a value of the virtual address space corresponding to the instance may also be directly used as an identifier of the instance.

In an implementation, the first node stores a first mapping table, the first mapping table indicates a plurality of mapping relationships including the first mapping relationship, and each of the plurality of mapping relationships is mapping between a physical address and a bus address.

An implementation form of the first mapping table and a manner in which the plurality of mapping relationships including the first mapping relationship are carried in the first mapping table are not limited in this disclosure. The mapping table may be a single table or a multi-level table, for example, a multi-level linked table. Therefore, the first mapping relationship may be recorded in a row or a column in a single table, or may be recorded in an entry in the multi-level linked table. This entry may be cross-level, and the physical address and a corresponding bus address may be at different levels. In other words, an implementation of the entry in the first mapping table is not limited either. One entry indicates one mapping relationship between a physical address and a bus address.

The first mapping table may also be a page table. Because the page table is segmented and layered based on the physical address, content of the page table records a corresponding bus address. In this way, management and use are facilitated. The first mapping relationship table may be stored in the memory of the first node, and then a part of the first mapping relationship table is cached in the bus end point, which is similar to a translation lookaside buffer (TLB) in a memory management unit (MMU). In this way, accessing the memory by the bus end point can be reduced.

In an implementation, the method further includes: obtaining an address space of the second node, where the address space indicates at least one bus address; and updating the first mapping table based on the obtained address space of the second node, so that the updated first mapping table includes at least one entry that corresponds to the at least one bus address indicated by the address space. It can be learned that a shared address space (sharing means that the address space is accessed by a node other than the second node) in the second node is obtained, and the shared address space is maintained in the first mapping table, to ensure that the first node can access storage space of the first node based on the first mapping table and the bus address, and the first mapping table is updated, so that the first node can synchronize information provided by the second node.

A method for updating the first mapping table is described herein, and the first mapping table is updated by the driver of the bus end point. It should be understood that, provided that content of the first mapping table is added and replaced, it can be referred to as that the first mapping table is updated. For example, content of an entry is filled in an empty first mapping table, or one or more new entries are added to an existing first mapping table (for example, the first mapping table has included several entries with content), or originally stored content of one or more entries in the first mapping table is replaced.

The obtained address space of the second node is an address space that may be accessed by another node in the second node, and may be notified by the second node to the first node, or may be actively queried by the first node from the second node or a management node in a communication system including the first node and the second node. However, a representation form of the obtained address space is not limited in this disclosure. For example, the address space may be represented by using two addresses (that is, a start address and an end address), or may be represented by using one address and one address offset.

Correspondingly, according to a second aspect, an embodiment of this disclosure provides a request processing method. The method is performed by a second node. The second node is a device that processes a request, or a component (for example, a chip) of the device, or another component that can complete processing of the request to access a function of a corresponding storage medium. The method includes: receiving a request from a first node, where the request is used to read data in the second node or is used to write data to the second node, the request includes a bus address, and the bus address indicates a virtual address corresponding to an instance of the second node; and obtaining a physical address corresponding to the request in a storage medium of the second node based on the bus address and a second mapping relationship, to perform an operation indicated by the request, where the second mapping relationship is a mapping relationship between the bus address and the physical address corresponding to the request.

It can be learned that, the second aspect corresponds to the first aspect, and provides a supplementary description of the method in the first aspect from a perspective of the second node. Many nouns in the second aspect correspond to nouns in the first aspect. For example, the request from the first node corresponds to a second request sent by the first node in the first aspect. Therefore, descriptions of various words or sentences in the first aspect (for example, the second request in the first aspect is a request from the first node in the second aspect) and descriptions of technical effects are also applicable to the second aspect if being used in the second aspect. Details are not described again.

The physical address corresponding to the request is a physical address in which data that the request indicates to read or write is located. The physical address corresponding to the request belongs to a physical address space of the instance of the second node, and this can be determined based on the virtual address of the instance.

It can be learned from the method procedure described in the second aspect that, although the bus address in the request indicates the virtual address corresponding to the instance of the second node, the instance of the second node may not perceive a request processing process. In this case, a main purpose of the instance is to share an address space (the physical address space and a corresponding virtual address space) corresponding to the instance, so that the first node can send the request, and read data from or write data to the address space corresponding to the instance.

In an implementation, the second node includes a bus end point, and the bus end point is configured to process the request from the first node based on the second mapping relationship. It can be learned that the second node that receives the request also needs to include the bus end point, so that the second node can access a bus, to receive the request from the first node and perform processing.

In an implementation, the bus address includes an identifier of the bus end point and a second virtual address, and the second virtual address is related to the instance.

For ease of management, the identifier of the bus end point may be unique in a domain (a full domain or a local domain).

In this case, the second mapping relationship is a mapping relationship between the second virtual address and the physical address corresponding to the request. The physical address corresponding to the request is a physical address to be accessed by data that the request is to read or write. For example, the physical address and the second virtual address correspond to a same instance, the second virtual address may be the virtual address corresponding to the instance, and the physical address belongs to a physical address space corresponding to the instance.

In an implementation, the second node stores a second mapping table, the second mapping table indicates a plurality of mapping relationships including the second mapping relationship, and each of the plurality of mapping relationships is mapping between a virtual address in the second node and a physical address corresponding to the virtual address in the second node.

It can be learned that, the second mapping relationship stored in the second node needs to match the bus address in the request from the first node, so that a physical address that needs to be accessed can be obtained, to complete communication between the first node and the second node. In the second node, the second mapping table in which the second mapping relationship is located also maintains a plurality of entries that indicate mapping between the virtual address in the second node and the physical address in the second node.

In an implementation, the second mapping table is updated by a driver of the bus end point.

In an implementation, the method further includes: obtaining an address allocation request of the instance, where the address allocation request indicates that the instance provides a physical address space corresponding to the instance; and updating the second mapping table based on the address allocation request, so that the updated second mapping table includes at least one entry that corresponds to the physical address space corresponding to the instance.

The instance may provide all or a part of the physical address space corresponding to the instance. In other words, the second mapping table is updated based on the address allocation request, to indicate that the instance may share an address segment in the physical address space corresponding to the instance in this manner. A specific segment or several specific segments to be shared and a length of an address segment are not limited in this disclosure.

It can be learned that the second node obtains the address allocation request of the instance of the second device, and the address allocation request may be actively sent by the instance, for example, to the driver of the bus end point, or may be actively obtained by the second node. It can be learned that the second node may share an address segment in the second node in a form of the second mapping table by using an instance running on the second node or a device that may be accessed by the instance running on the second node, so that another node accesses an address or a segment of address in the address segment. The address segment is the physical address space corresponding to the instance, and is usually in a memory of the second node, or certainly may be in another storage device of the second node.

An implementation of the second mapping table is similar to that of the first mapping table. For specific descriptions, refer to descriptions about the first mapping table in the first aspect. Therefore, the updated second mapping table includes the at least one entry that corresponds to the physical address space corresponding to the instance, and a virtual address recorded in some entries in the second mapping table may be a virtual address corresponding to the instance. In other words, an entry in the second mapping table may not record one address or a segment of address in the physical address space corresponding to the instance, but records a virtual address corresponding to a physical address in the physical address space.

The second aspect further describes another implementation of the bus address. Correspondingly, a manner in which the second node uses and manages the bus address is also different from the foregoing implementation.

The bus address further includes an identifier of the instance. Usually, the identifier of the instance is a name or a number of the instance. However, another quantity may be used as the identifier of the instance, provided that different instances can be distinguished. In an implementation, the identifier of the instance further indicates a virtual address space corresponding to the instance, and the physical address corresponding to the request belongs to the physical address space corresponding to the instance.

In an implementation, the second mapping relationship includes mapping between the identifier of the instance and a page table base address of the instance and mapping between the second virtual address and the physical address corresponding to the request, and the mapping between the second virtual address and the physical address corresponding to the request is recorded in a page table of the instance. The page table base address is a base address of the page table, that is, a start location of storing the page table. An address segment may be indicated by using the base address plus an offset, and the page table may be stored in storage space indicated by the address segment. When the instance is a process, the page table base address of the instance is a start storage location of a page table of the process in the memory, and may indicate a physical address of the page table of the process.

It can be learned that, when the bus address includes the identifier of the instance, the second mapping relationship includes two parts. In this case, the page table base address of the instance can be found based on the identifier of the instance, in other words, the page table of the instance can be located. In the page table of the instance, a physical address that needs to be operated in response to the request from the first node, that is, the physical address corresponding to the request from the first node is found based on the second virtual address. When the instance is a process, mapping between a virtual address and a physical address may be maintained by sharing a page table of an existing process. This is more convenient. The page table of the process is usually used by an I/O MMU and an MMU. Certainly, in some implementations, the page table of the process may also be used by the bus end point.

In an implementation, the second node stores a third mapping table, the third mapping table includes a plurality of entries, the mapping between the identifier of the instance and a page table base address of the instance is recorded in one of the plurality of entries, each of the plurality of entries is used to record information about an instance of the second node, and the information includes the identifier of the instance and the page table base address of the instance.

It can be learned that, when the bus address includes the identifier of the instance, in some implementations, two tables maintained in the second node, that is, a third mapping table and the page table of the instance, are both used in the foregoing method. An implementation of the third mapping table is not limited in this disclosure. For example, the third mapping table may be a mapping table that is in the second node and that is used to record and manage an instance of the second node. A format of an entry in the third mapping table is not limited in this disclosure either. For example, the entry may further include information other than the identifier of the instance and the page table base address of the instance.

Similar to the second mapping table, the third mapping table is updated by the driver of the bus end point.

In an implementation, the method in the second aspect further includes: updating the third mapping table based on information about the instance of the second node, so that the updated third mapping table includes an entry that corresponds to the information, and the information includes the identifier of the instance and the page table base address of the instance.

A manner of updating the third mapping table is similar to a manner of updating the second mapping table. Details are not described herein again. Information about the instance of the second node is usually collected by a module in an OS of the second node, and the driver of the bus end point also runs in the OS. The information about the instance of the second node may also be actively reported by the instance to the driver of the bus end point when the instance is created or put into use.

When the bus address does not include the identifier of the instance, an address translation process described in the second aspect may be completely executed by the bus end point, or may be completely executed by the I/O memory management unit. When the bus address does not include the identifier of the instance, an address translation process described in the second aspect may be completely executed by the bus end point, or may be completely executed by the I/O MMU. Alternatively, as described above, an address translation process described in the second aspect is executed in a cooperation manner in which the bus end point queries the third mapping table and the I/O MMU queries the page table of the instance. A device used in the address translation process and a specific processing process are not limited in this disclosure.

According to a third aspect, an embodiment of this disclosure provides a request processing system. The system includes a first processor, an MMU, a first bus end point, a second processor, a storage medium, and a second bus end point, the second processor runs an instance, and a physical address space of the instance points to the storage medium.

The MMU is configured to obtain a physical address corresponding to a first virtual address based on a first request from the first processor. The first request is used to request to read data or request to write data, and the first request includes the first virtual address. The first bus end point is configured to send a second request to the second bus end point based on a first mapping relationship. The first mapping relationship is a mapping relationship between the physical address and a bus address, the second request corresponds to the first request, the second request includes the bus address, and the bus address indicates a virtual address corresponding to the instance. The second bus end point is configured to receive the second request. The second bus end point is further configured to process the second request based on the bus address and a second mapping relationship, to obtain a result corresponding to the request. The second mapping relationship is a mapping relationship between the bus address and a physical address corresponding to the second request, and the physical address corresponding to the second request belongs to a physical address space of the instance.

It can be learned that the third aspect corresponds to the first aspect and the second aspect, and describes a solution from a perspective of the system. In an implementation, it may be considered that the system in the third aspect includes two nodes, and one of the two nodes includes the first processor, the MMU, and the first bus end point, and corresponds to the foregoing first node. The other one includes the second processor, the storage medium, and the second bus end point, and corresponds to the foregoing second node. The first processor and the second processor respectively run different OSs. Many nouns in the third aspect correspond to the nouns in the first aspect and the second aspect. Therefore, descriptions of various words or sentences in the first aspect and the second aspect, descriptions of various implementations, and descriptions of technical effects are also applicable to the third aspect if being used in the third aspect. Details are not described again.

It should be noted that, that the physical address space of the instance points to the storage medium means that a physical address that may be used by the instance belongs to the storage medium, or a physical storage resource that can be used by the instance is a part of the storage medium.

In the system, if the bus address does not include the identifier of the instance, the second bus end point is configured to access the physical address corresponding to the request in the storage medium based on a second virtual address in the bus address and the second mapping relationship, to perform an operation indicated by the request, for example, read data stored in the physical address or write data in the second request to the physical address.

When the bus address does not include the identifier of the instance, the system further includes an input/output memory management unit (IOMMU). The IOMMU is configured to: find the physical address corresponding to the request based on the page table of the instance, to perform an operation corresponding to the second request, and return a result of the operation to the second bus end point. Correspondingly, the second bus end point is configured to: find the page table base address of the instance based on the bus address and the mapping between the identifier of the instance and the page table base address of the instance, and transfer the page table base address of the instance to the IOMMU.

Certainly, the system may always include the IOMMU, and is compatible with the two implementations.

According to a fourth aspect, an embodiment of this disclosure provides a request processing apparatus. The apparatus is located on a first node, and the apparatus includes: a processing module, where the processing module is configured to send a first request to an address translation module, and the first request is used to request to read data of a second node or request to write data to a second node, where the address translation module is configured to obtain a corresponding physical address based on a first virtual address, where the first virtual address is a virtual address in the first request; and a bus communication module, configured to send a second request to the second node based on a first mapping relationship, where the first mapping relationship is a mapping relationship between the physical address and a bus address, the second request corresponds to the first request, the second request includes the bus address, and the bus address indicates a virtual address corresponding to an instance of the second node.

The address translation module in the fourth aspect is equivalent to the bus end point described above.

The fourth aspect describes an apparatus corresponding to the method in the first aspect, and the apparatus has a function of implementing the request processing method in any implementation of the first aspect. The function may be implemented by hardware, or may be implemented through cooperation of software and hardware. The hardware or software includes one or more modules corresponding to the foregoing function. Many nouns in the fourth aspect correspond to nouns in the first aspect, and are also associated with the method in the second aspect and the system in the third aspect. Therefore, descriptions of various words or sentences in the first aspect, the second aspect, and the third aspect, descriptions of various implementations, and descriptions of technical effects are also applicable to the fourth aspect if being used in the fourth aspect. Details are not described again.

According to a fifth aspect, an embodiment of this disclosure provides a request processing apparatus. The apparatus is located on a second node, and the apparatus includes: a processing module and a storage medium, where the processing module is configured to run an instance, and a physical address space of the instance points to the storage medium; and a bus communication module, configured to receive a request from a first node, where the request is used to read data or is used to write data, the request includes a bus address, and the bus address indicates a virtual address corresponding to the instance; and further configured to process a second request based on the bus address and a second mapping relationship, to obtain a result corresponding to the request, where the second mapping relationship is a mapping relationship between the bus address and a physical address corresponding to the request, and the physical address corresponding to the request belongs to a physical address space of the instance.

An address translation module in the fifth aspect is equivalent to the bus end point described above.

A fifth aspect describes an apparatus corresponding to the method in the second aspect, and the apparatus has a function of implementing the request processing method in any implementation of the second aspect. The function may be implemented by hardware, or may be implemented through cooperation of software and hardware. The hardware or software includes one or more modules corresponding to the foregoing function. Many nouns in the fifth aspect correspond to nouns in the second aspect, and are also associated with the method in the first aspect and the system in the third aspect. Therefore, descriptions of various words or sentences in the first aspect, the second aspect, and the third aspect, descriptions of various implementations, and descriptions of technical effects are also applicable to the fifth aspect if being used in the fifth aspect. Details are not described again.

According to a sixth aspect, an embodiment of this disclosure provides a chip. The chip includes a processing circuit and a storage medium, and the storage medium stores instructions. When the instructions are executed by the processing circuit, the chip performs the request processing method according to any one of the foregoing aspects.

According to a seventh aspect, an embodiment of this disclosure provides a request processing device. The device includes a storage medium, a processing circuit, an MMU, and a bus end point, the storage medium is coupled to the processing circuit, the storage medium is configured to store computer program code, the computer program code includes computer instructions, and when the computer instructions are executed by the processing circuit, the following method is performed. The MMU obtains a corresponding physical address based on a first virtual address. The first virtual address is a virtual address in a first request, and the first request is used to request to read data of another device or request to write data to the other device. The bus end point sends a second request to the other device based on a first mapping relationship. The first mapping relationship is a mapping relationship between the physical address and a bus address, the second request corresponds to the first request, the second request includes the bus address, and the bus address indicates a virtual address corresponding to an instance of the other device.

The seventh aspect describes an apparatus corresponding to the method in the first aspect, and the apparatus has a function of implementing the request processing method in any implementation of the first aspect. Many nouns in the seventh aspect correspond to nouns in the first aspect, and are also associated with the method in the second aspect and the system in the third aspect. Therefore, descriptions of various words or sentences in the first aspect, the second aspect, and the third aspect, descriptions of various implementations, and descriptions of technical effects are also applicable to the seventh aspect if being used in the seventh aspect. Details are not described again.

According to an eighth aspect, an embodiment of this disclosure provides a request processing device. The device includes a storage medium, a processing circuit, and a bus end point, the storage medium is coupled to the processing circuit, the storage medium is configured to store computer program code, the computer program code includes computer instructions, and when the computer instructions are executed by the processing circuit, the bus end point is indicated to perform the following method: receiving a request from another device, where the request is used to read data of the device or is used to write data to the device, where the request includes a bus address, and the bus address indicates a virtual address corresponding to an instance of the device; and obtaining a physical address corresponding to the request in a storage medium of the device based on the bus address and a second mapping relationship, to perform an operation indicated by the request, where the second mapping relationship is a mapping relationship between the bus address and the physical address corresponding to the request.

An eighth aspect describes an apparatus corresponding to the method in the second aspect, and the apparatus has a function of implementing the request processing method in any implementation of the second aspect. Many nouns in the eighth aspect correspond to nouns in the second aspect, and are also associated with the method in the first aspect and the system in the third aspect. Therefore, descriptions of various words or sentences in the first aspect, the second aspect, and the third aspect, descriptions of various implementations, and descriptions of technical effects are also applicable to the eighth aspect if being used in the eighth aspect. Details are not described again.

The following ninth aspect to the following fourteenth aspect correspond to the first aspect, the second aspect, or the third aspect. Descriptions of various words or sentences in the first aspect, the second aspect, and the third aspect, descriptions of various implementations, and descriptions of technical effects are also applicable to the following aspects if being used in the following aspects. Details are not described again.

According to a ninth aspect, a communication apparatus is provided, including a processor. The processor is configured to: be coupled to a storage, and after reading instructions in the storage, perform the request processing method according to the instructions according to any one of the foregoing aspects.

According to a tenth aspect, an embodiment of this disclosure provides a communication apparatus. The apparatus may be a chip system, and the chip system includes a processor, and may further include a storage, configured to implement a function of the method described in any one of the foregoing aspects. The chip system may include a chip, or may include a chip and another discrete component.

According to an eleventh aspect, a communication apparatus is provided. The apparatus may be a circuit system, the circuit system includes a processing circuit, and the processing circuit is configured to perform the method according to any one of the foregoing aspects.

According to a twelfth aspect, an embodiment of this disclosure further provides a computer-readable storage medium, including instructions, and when the instructions run on a computer, the computer is enabled to perform the method according to any one of the foregoing aspects.

According to a thirteenth aspect, an embodiment of this disclosure further provides a computer program product, including instructions, and when the computer program product runs on a computer, the computer is enabled to perform the method according to any one of the foregoing aspects.

According to a fourteenth aspect, an embodiment of this disclosure provides a system. The system includes the request processing apparatus according to the fourth aspect and the request processing apparatus any implementation of the fifth aspect.

DESCRIPTION OF EMBODIMENTS

Figure 1:
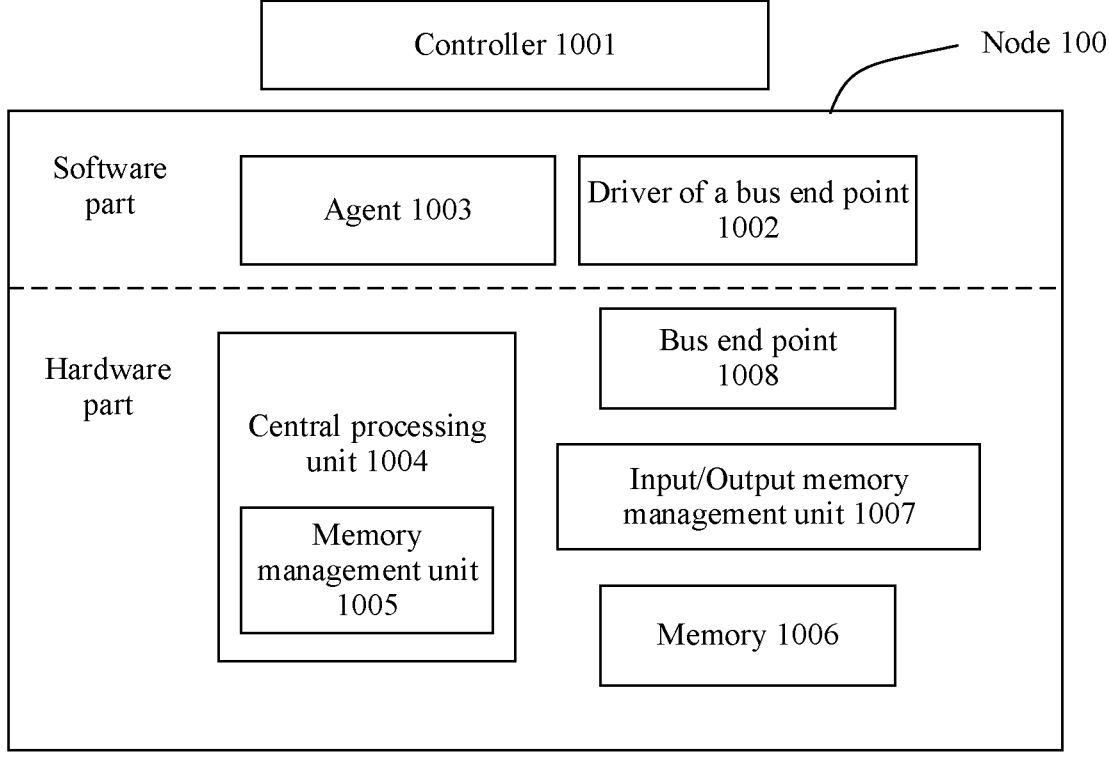
FIG. 1 is a schematic diagram of a request processing architecture according to an embodiment of this disclosure.

First, some possible expression manners that may appear in this disclosure are described.

"First" and "second" are used to distinguish between different objects or distinguish between different processing of a same object, but do not describe a particular order of the objects.

"At least one" means one or more, and "a plurality of" means two or more.

A term "and/or" describes an association relationship between associated objects and represents that three relationships may exist. For example, A and/or B may represent the following cases: only A exists, both A and B exist, and only B exists, where A and B may be singular or plural.

The character "/" usually indicates an "or" relationship between the associated objects. For example, A/B may represent A or B.

In addition, the terms "include", "comprise", and "have" mentioned in the descriptions of this disclosure are intended to cover non-exclusive inclusion. For example, a process, a method, a system, a product, or a device that includes a series of steps or units is not limited to the listed step or unit, but optionally further includes another unlisted step or unit, or optionally further includes another step or unit inherent to the process, the method, the product, or the device.

It should be noted that, in this disclosure, the word such as "example" or "for example" is used to represent giving an example, or a description. Any implementation (for example, embodiments of this disclosure) or design scheme of "example" or "for example" should not be construed as having more advantages than another implementation or design scheme. The words such as "example" or "for example" are used to present related concepts in a specific manner.

In the specification and accompanying drawings of this disclosure, "of", "related", and "corresponding" may be interchangeably used sometimes. It should be noted that, expressed meanings are the same when a difference is not emphasized.

The following briefly describes some terms that appear in this disclosure.

Instance: The instance is a software module that may run an application or a system program. In addition, the software module can be referred to as an instance only when being run by an OS. If the software module is not run by the OS, the software module is only a segment of code. The instance has a plurality of representation forms. For example, a process and a thread each may be understood as a type of instance. The instance runs on a node.

Node: The node is a device with at least one of two functions: a data processing function and a data storage function. An OS runs on the node. The node may be distinguished by an OS. In other words, different nodes run different OSs. In other words, it may be considered that hardware and software used for running an OS belongs to a same node. In this disclosure, the node may be a complete physical machine, for example, a terminal or a network device, for example, a server or a server agent. The node may alternatively be a component in a physical machine, for example, a processor, a memory, and a storage. When a physical machine includes two nodes, the two nodes run different OSs. For example, if the physical machine includes a central processing unit (CPU) that runs an OS 1 and a graphics processing unit (GPU) that runs an OS 2, it may be considered that the CPU and the GPU belong to different nodes. When the node is a component, the node is an independent individual in terms of hardware. The "independent individual" may be understood as a circuit or module having a dedicated function, and the device is packaged or assembled on a physical machine. It can be understood that, data access in this disclosure means that one node accesses, through an instance, data maintained by another node. A device of the node is a part or a component of the node. For example, when the node is a physical machine, both a CPU and a memory are devices of the node. The physical machine is a computer packaged into a product, for example, a server, a desktop computer, an all-in-one PC (AIO), a notebook computer, or a smartphone.

A terminal may include a desktop type, a laptop type, a handheld type, a vehicle-mounted user terminal (UE) device, or the like, for example, another type of communication device such as a smartphone, a cellular phone, a desktop computer, a tablet computer, a smart television, a smart television box, an ultra-mobile personal computer (UMPC), a notebook computer, a personal digital assistant (PDA), a portable multimedia player (PMP), a dedicated media player, a consumer type communication device, a wearable device (for example, a smartwatch), or an AR (augmented reality)/VR (virtual reality) device.

Local: For an instance, a node that runs the instance is local. For example, a full name of a local memory needs to be a "local memory of an instance", that is, a memory of a node that runs the instance. The node that runs the instance may be described at different granularities. For example, the node may be only a processor, for example, a CPU or a GPU, or may be a complete physical machine, that is, includes a processing circuit and a storage medium. Specifically used descriptions depend on whether a data access process crosses a physical machine.

Remote: "Remote" is a concept opposite to "local". To be specific, for an instance, a node other than a node that runs the instance is remote. "Remote" may indicate a device with a computing capability, or may be a device configured to store data.

Global: A range indicated by "global" is a group of nodes that are deployed with a bus end point described in this disclosure and that may read data from or write data to each other in a method described in this disclosure. Locations and a range of the group of nodes in actual space are not limited in this disclosure. For example, the group of nodes may be in a data center, may cross a data center, may be in an enterprise campus, or may cross a city or a country.

Identifier: The identifier is used to distinguish one type of thing or one thing from other things that are of a same type or different types, for example, an identifier of a node, an identifier of a network, and an identifier of a network adapter. The identifier may be a name or a number. Alternatively, a distinguishing feature may be used as an identifier. For example, a type identifier is used. Implementations of various identifiers are not limited in this disclosure, provided that the identifiers are distinguished. For example, in some implementations of this disclosure, an identifier of a virtual address space of an instance is used as an identifier of the instance, instead of a common case in which a name or a number of the instance is used as the identifier of the instance.

Address space: The address space may also be referred to as storage space, and is one or more segments of addresses that can be used by a device or an instance. For example, a virtual address space of a device or an instance is one or more segments of virtual addresses that can be used by the device or the instance, that is, one or more segments of virtual addresses that belong to the device or instance. A virtual address space of a device or an instance is allocated by an OS in which the device or the instance is located. For another example, a physical address space of a device or an instance is one or more segments of physical addresses allocated to the device or the instance for use. When the device or the instance uses the physical address space, an address in the physical address space cannot be used by another device or instance. A physical address space of an instance is allocated by an OS that runs the instance. Such allocation may be dynamic. For example, as the instance runs, a larger physical address space is occupied, but there is an upper limit. A size and a range of a physical address space of a device are usually fixed.

Page table: The page table is a data structure, and may be used to record a mapping relationship between two types of data. The page table is usually used to translate a virtual address to a physical address. A hierarchical page table is also one type of page table. The page table is stored in a storage medium. A base address of the page table is also briefly referred to as a page table base address, and is a start address of a physical address of storing the page table. A size of the page table determines a value range of a virtual address corresponding to the page table. The virtual address in the page table is a virtual address of an instance or a device that uses the page table, and indicates an offset of a physical address of a location (or an entry) in the page table relative to the page table base address. Data stored at a location in the page table is a physical address in a physical address space of an instance or a device that uses the page table. A page table includes a plurality of entries, and each entry may indicate a mapping relationship between a virtual address and a physical address of an instance or a device that uses the page table. It should be understood that, the entry described herein is a functional description, and a specific implementation of the entry is not limited in this disclosure. For example, a mapping relationship between a virtual address and a physical address may be cross-level, or a mapping relationship between a virtual address and a physical address may be indirect. A specific implementation of the page table is not limited in this disclosure. For example, the page table may be a multi-level page table, or may be a hash table.

Page table of a process: The page table of the process is also briefly referred to as a process page table, and records a mapping relationship between a virtual address in a virtual address space of a process and a physical address in a physical address space of the process.

Bus: In other technologies, a bus is an internal structure of a computer, and is a common communication trunk that transmits information between various functional parts of the computer. Buses of the computer may include a data bus, an address bus, and a control bus, and the data bus, the address bus, and the control bus are respectively used to transmit data, an address of the data, and a control signal. In this disclosure, the bus is short for an HPIB. The bus not only may connect various parts inside the computer, but also may replace a network and be laid between different computers, to connect different computers. Each computer accesses the HPIB through a bus end point, and the bus end point is equivalent to a communication module such as a network adapter or a baseband antenna in a network technology. This disclosure describes how to complete, based on a function of the bus after hardware is laid, processing of a request for reading data or writing data, that is, a method for accessing a remote storage medium. Specific structures of the HPIB and the bus end point are not described in detail in this disclosure.

Memory semantics: The memory semantics is a communication instruction used when components connected through a bus in a physical machine communicate with each other. Such communication is also referred to as bus communication, and is communication between different instances or devices in a same OS. Therefore, a network communication technology does not need to be used. A load/store instruction is typical memory semantics.

An existing communication technology may include network communication and bus communication, and information exchange related to communication may be data transmission, or may be a transmission instruction. Network communication is used for communication between a local device and a remote device. A transmitted packet is usually packaged based on a protocol stack in an OS, and a network communication protocol is used. In network communication, information is usually transmitted by using a send/receive instruction in a network communication technology or a read/write instruction in RDMA. Before the semantics is used, a connection needs to be established. This is briefly referred to as link establishment. When a cluster size constantly increases, link establishment overheads are very high. In addition, network semantics provided by the RDMA bypasses a protocol stack in a kernel of the OS, and can effectively reduce an end-to-end network delay. However, an asynchronous notification mechanism of the RDMA and a lengthy sending procedure of a network adapter still restrict further reduction in the delay.

Bus communication is used for communication between components connected through a bus in a device. In bus communication, memory semantics (for example, a load/store instruction) is used to transmit information. The memory semantics does not impose the foregoing limitation, and bus communication has a faster communication speed than network communication. In an existing technical solution in which memory semantics is used, a local device may take over a memory of a remote device. In other words, the memory of the remote device is used as an extension to a memory of the local device, and is equivalent to an external storage module of the local device. The remote device has no right to use and manage the memory, and the memory cannot be used by another device. In an existing solution, the remote device reads and writes data based on a physical address of a memory of the shared device. Therefore, it is equivalent to that a memory indicated by the physical address is allocated to the remote device for use, and the shared device has no right to manage the memory again.

This disclosure provides a virtual address addressing-based request processing method based on virtual address addressing, to implement remote memory semantics. In other words, a capability basis of sharing a storage medium (for example, a memory) is provided when a problem that a link establishment overhead and a delay in a network semantics are high is resolved remotely. The technical solutions in this disclosure also support sharing of a remote storage medium. For example, through configuration, processes of a plurality of nodes may map a same remote memory onto respective local address spaces, so that sharing of the remote memory is implemented, and local and remote memory access behaviors are unified. That is, in the technical solution described in this disclosure, remote data can be accessed like local data. In a new communication technology described in this disclosure, a bus technology used for communication between local components (that is, in one device) and a network technology used for local-remote communication may be unified. That is, the two communication scenarios are not distinguished, but a same communication method is used in the two communication scenarios.

The following describes, based on FIG. 1, a diagram of an architecture to which this disclosure is applicable. A controller (1001 in the figure may be on a node the same as or different from another component, and it can be understood that other parts belong to one node. It should be understood that, the architecture described in FIG. 1 includes a node 100 and the controller 1001, and the controller 1001 is schematically not included in the node 100. It should be understood that the architecture described in FIG. 1 is merely a schematic diagram for ease of understanding, and is not a limitation on an architecture that may be used by a node mentioned in this disclosure. Another software part, for example, an OS and another hardware part, for example, a display, of the node 100 are not displayed.

The architecture includes two parts: hardware and software. The hardware includes the following parts:

CPU 1004 and MMU 1005: The CPU and the MMU are usually packaged into one chip. The CPU runs an application, and initiates a request for reading data or writing data, which is also briefly referred to as a memory access request, that is, a request for accessing a storage medium, because an address in the storage medium (for example, a memory) needs to be found for reading the data or writing the data. The MMU is responsible for translating an address of a memory access request initiated by the CPU, that is, translating a virtual address in the memory access request into a physical address.

Memory 1006: A storage medium on the node is shown by using the memory in FIG. 1 as an example, and a physical form of the memory may be a memory module. In a method in this disclosure, in addition to being provided to a local instance (for example, a process) for use, the memory may be used by an instance of another node. A manner in which the instance of the other node uses the memory is to write data to the memory or request to read data in the memory, based on a request in the method described in this disclosure.

IOMMU 1007: A function of the IOMMU 1007 is similar to a function of the MMU 1005, but the IOMMU is responsible for translating an address of a memory access request of hardware other than the CPU. For example, if the hardware is a memory, the memory access request is used to request to write data to the memory or request to read data in the memory. The hardware other than the CPU may be another component with direct memory access (DMA).

Bus end point 1008: The bus end point 1008 is also briefly referred to as an end point (EP), and is used by the node to access an HPIB. A function is equivalent to a network adapter. The bus end point is usually a hardware module with an address translation function. Similar to a network, the bus end point can be used by the OS of the node only when a driver is installed in an OS of the node. One node may include a plurality of bus end points, like one node may be installed with a plurality of network adapters. One node may include both a bus end point and a network adapter. In FIG. 1, no network adapter is drawn, and only the bus end point is schematically indicated. If information is exchanged through an HPIB, that is, based on memory semantics in all remote communication of the node, the node may include only the bus end point. In actual cabling, one end of the bus end point may be connected to the CPU, the memory, or the MMU, and the other end may be connected to a high-performance bus or a switch of the high-performance bus.

In an implementation, another device (for example, the CPU and the memory) related to data reading and writing in the node may also be integrated with a bus end point, and the bus end point is used as an interface or a communication module and is packaged together with these devices.

In an implementation, the function of the IOMMU 1007 and a function of the bus end point 1008 may be integrated on one chip for an implementation, that is, may be integrated into a component of hardware for deployment. In this case, it may also be considered that the bus end point has the function of IOMMU.

It should be understood that, in this disclosure, an address translation process in a destination or a second node may be completely executed by the bus end point, or may be completely executed by the IOMMU, or may be executed by the bus end point and the IOMMU through cooperation. This disclosure merely provides descriptions (for details, refer to examples provided below from a perspective of a system), but imposes no limitation on a specific implementation.

In a software module in this architecture, the controller 1001 is configured to maintain an address space shared by an instance of each node in a global range. Sharing means that not only a node that runs the instance can access the address space, but also another node can access the address space. The controller may store information about the address space shared in the global range, and have a right to manage the information. Logically, it may be considered that the address space in the global range may be centrally managed by one controller. In actual deployment, the logically centralized controller may be a dedicated server or server cluster, or may be directly deployed on one or more nodes. A communication system including a plurality of nodes may include one or more controllers, depending on a size of the communication system. If the communication system includes a plurality of controllers, the plurality of controllers may communicate based on a technical solution described in this disclosure, or may communicate based on an existing network communication technology, for example, a TCP/IP. Therefore, the controller 1001 in the figure may not belong to a node in which another part in the figure is located.

A software module deployed on a same node as the hardware includes the following parts:

Driver of the bus end point (EP driver) 1002: The driver is a software module that is in a kernel of an OS that runs on the node and that is configured to drive the hardware module of the bus end point. The driver has a same capability as a driver of other hardware, so that the OS can sense and use the corresponding hardware. In addition, the driver is further configured to configure or update a table used by the bus end point to convert a bus address, for example, the first mapping table and the second mapping table that are mentioned above.

Agent 1003: The agent 1003 is configured to: manage shared memory of a local node, and communicate with the controller 1001. The agent 1003 and the controller 1001 may communicate through the HPIB described in this disclosure, or may communicate through the Ethernet. In an implementation, the driver of the bus end point may have a function, of the agent, of managing the shared memory of the local node. In other words, the two modules are merely obtained through schematic division from a perspective of a function.

The first virtual address described above may be an address in an address range indicated by a virtual address space of an instance of a source (that is, the first node described above). This instance is an instance that executes an operation of a first request. From a perspective of the instance of the source, an entire method is implemented as follows. The instance runs the first request, and obtains a result of running the first request. For example, if the first request is to request to perform reading from a storage medium of a second node, that is, to read data, the result is that requested data is obtained from the storage medium. For another example, if the first request is to request to perform writing to the storage medium of the second node, that is, to write data, the result is that the data is successfully written to the storage medium (for example, a memory) of the second node. The process that can be perceived by the instance is the same as that of performing reading from/writing to a local storage medium. Therefore, from a perspective of software of the source, that is, for a processor that is the source and that runs the instance, a process of reading data of a local memory and a process of reading data of a remote memory are unified. However, a specific processing process of obtaining a result corresponding to the first request is a procedure of the method described in this disclosure. To be specific, this disclosure describes a specific process of implementing the foregoing code, and hardware of the first node and hardware of the second node are used. However, from a perspective of software code, it may be considered that the instance executes the first request, or that the instance initiates the first request.

Therefore, this disclosure emphatically describes a process in which the first node sends a request to the second node and the second node performs an operation corresponding to the request, that is, a request processing process, and does not describe in detail how to notify the first node after the second node completes data reading or writing. A reason is that, for an implementation of a subsequent part may refer to the descriptions of the request processing process. For example, the subsequent part is to send feedback information from the second node to the first node. Related address translation is equivalent to a reverse process of address translation described below. This is not expanded in this disclosure, to save space. It should be understood that, in the foregoing scenario, the first node is a source node (also referred to as a source), and the second node is a destination node (also referred to as a destination); and in another scenario, the first node may be a destination node. In addition, because one node may simultaneously communicate with a plurality of nodes or a plurality of devices of one node, one node may serve as both a source node and a destination node.

The following describes a request processing method in this disclosure. This description is provided by using an example in which a process in one node accesses a memory of another node. The method may also be referred to as a multi-stage address translation mechanism based on virtual address addressing. This mechanism may be applied to a scenario in which nodes in the cloud interact, a scenario in which terminals interact, and a scenario in which a terminal interacts with a device in the cloud. In other words, any one of the two nodes may be a device, for example a server, that may initiate a memory access request or that may share a storage resource in a terminal or a network.

For a scenario in which a process accesses a local storage medium in a node, address translation is to translate a virtual address (VA) used by the process into a physical address (PA) used by the process. The physical address is an address in a physical address space of the process. The virtual address and the physical address used by the process are both allocated by an OS of the node to the process. An address translation process is completed by hardware, namely, an MMU. In a non-virtualized scenario, the virtual address used by the process is directly translated into the physical address used by the process. In a virtualized scenario, translation needs to be performed for two times. To be specific, the virtual address of the process is translated into a guest physical address (GPA), and then the GPA is translated into a host physical address (HPA). The method described in this disclosure does not currently relate to the virtualized scenario.

Similarly, if a process of one node (which may be referred to as a source) needs to perform reading from or writing to a memory of another node (which may be referred to as a destination), a virtual address used by the process of the source, briefly referred to as a source virtual address (SVA), needs to be translated into a physical address of the destination, briefly referred to as a destination physical address (DPA). In this disclosure, the source communicates with the destination through an HPIB. Because of cross-node communication, address translation needs to be performed in a plurality of stages, to be specific, source virtual address SVA→tagged physical address (TPA) in the source→addressable virtual address (AVA)→destination physical address DPA. The following expands descriptions of each process:

SVA→TPA: The SVA is equivalent to a first virtual address in the foregoing first request. Herein, the first request is initiated by a process run in a CPU of the source, and the TPA is equivalent to a physical address corresponding to the foregoing first virtual address. Address translation of this part may be performed by the MMU. For example, an existing MMU and a process page table may be shared. In other words, a virtual address of the process is translated into a physical address of the process. In this case, the CPU of the source or the process does not perceive that a remote memory (that is, the memory of the destination) is to be accessed, because from a perspective of the CPU of the source and the process, this process is the same as address translation of accessing the local memory. For example, the SVA is stored in a register of the CPU, and the MMU uses the SVA as an input of this address translation. A physical address recorded in the process page table is also stored in the register, and the process page table may be multi-level. Therefore, when the process page table is shared to implement address translation from the SVA to the TPA, a value of the SVA is an offset relative to a base address of the process page table.

Actually, the process of SVA→TPA is different from that in other technologies, and a difference lies in the TPA. The TPA belongs to a physical address space of a bus end point.

A physical address obtained through translation in an existing local address translation process belongs to a physical address space of a DRAM or a physical address space of an I/O. The physical address space that is of the bus end point and to which the TPA belongs does not coincide with the physical address space of the DRAM and the physical address space of the I/O, because one physical address space can only be designated to one hardware module for use. Usually, in a start stage of a BIOS of the node, a device may negotiate with the BIOS to determine the physical address space. After the OS of the node is started, the BIOS notifies the OS. In this way, the OS does not take over an address space allocated to the bus end point. A page entry of the process page table used in this process is configured by a driver of the bus end point (EP driver), and the page entry includes the foregoing physical address that belongs to the physical address space of the bus end point, that is, the TPA. For other content of the process page table, refer to descriptions of the process page table in other technologies.

TPA→AVA: Hardware of the source, that is, a bus end point of the source is responsible for such address translation. The AVA is equivalent to the foregoing bus address, and a mapping relationship used in translation is equivalent to the foregoing first mapping relationship. The first mapping relationship may be carried in the foregoing first mapping table. After such address translation, a request, for example, a second request in Claims, that can be sent to the destination may be obtained. The first mapping table may be a page table, because such address translation is essentially to translate the physical address into a virtual address, and this is similar to a common function of the page table. The first mapping table is configured by the driver of the bus end point, and is used by the bus end point. Process page tables used in SVA→TPA are two different tables. When the first mapping table is a page table, it may be understood that the first mapping table is a page table of the bus end point, because when receiving, from another node, a request or an instruction that includes a bus address, the bus end point also needs to find a corresponding physical address based on the first mapping table.

The AVA is referred to as an addressable virtual address, because the AVA indicates a virtual address. Functionally, a physical address corresponding to the AVA may be found through a subsequent operation or based on a mapping relationship stored in the second node. Information included in the AVA needs to enable the AVA to have an addressing function. In other words, the second request can be sent to the destination through an HPIB. In other words, the AVA is equivalent to a destination address in network communication. The destination address in network communication enables a packet to be transmitted to a correct destination through a network.

In an implementation, the AVA includes a bus end point identifier (EP ID) and a destination virtual address (DVA).

The bus end point identifier indicates a bus end point, and is unique in a domain. Therefore, a bus end point identifier in a domain may also be referred to as a global identifier (GID) in the domain. In some implementations, the bus end point identifier may be configured to be globally unique. In this case, it is equivalent to indicating a bus end point that needs to receive the second request. Because one node may include a plurality of bus end points, a node identifier is not used. The EP ID may be uniformly allocated by a controller (for example, a controller 1001) in a domain.

The DVA indicates a virtual address related to a process run by the destination (that is, a process that shares a physical address corresponding to the DVA). In this case, another node may serve as a source and access a physical memory that is of the destination and that corresponds to the DVA. The DVA may be registered by the process of the destination through an agent of the destination, so that the agent of the destination synchronizes the DVA to the other node through the controller. This process is also referred to that the process of the destination shares the DVA. In this case, the other node may serve as a source and use the DVA.

The DVA needs to be unique in an OS of the destination. In other words, values of all virtual addresses need to be different in an OS.

In an implementation, the DVA in the second node may be customized. In this case, the virtual address space in which the DVA is located may also be considered as customized. In this implementation, the DVA is equivalent to a second virtual address in the bus address mentioned above. The method in this disclosure may be performed provided that it is ensured that values of all customized DVAs are different, and a mapping relationship between a plurality of customized DVAs and a plurality of readable and/or writable physical addresses is stored in the second node. The plurality of physical addresses may belong to the memory of the destination, or may belong to another storage medium of the destination.

In another implementation, the DVA includes an identifier of an instance and a virtual address (VA). In this implementation, the second virtual address in the bus address mentioned above is a VA in the DVA. The identifier of the instance is used to distinguish different instances of a node. An identifier of an instance included in a DVA also indicates an instance to which a virtual address VA in the DVA belongs. Then, in a node, values of VAs carried in different DVAs may be the same, and the VAs with a same value belong to different instances. In this case, even if the VA carried in the DVA cannot be globally unique in a node, confusion is not caused. Different DVAs may still correspond to different virtual addresses in the second node.

An implementation of the identifier of the instance is not limited. The identifier of the instance may be an identifier of the instance itself, or may be an identifier (address-space identifier (ASID)) of an address space of the instance. The address space of the instance herein is a virtual address space of the instance. For a DVA of an instance, if the instance is a process and an identifier of the instance is an ASID, a VA in the DVA may be indicated by a virtual address in a process page table of the process. In this case, the VA may be recorded by sharing the process page table. In this case, a physical address corresponding to the DVA may be obtained based on a page table base address of the process page table and the VA in the DVA. The page table base address of the process page table may be obtained based on the ASID in the DVA.

In some implementations, a part of the second request other than a field corresponding to the AVA may further include the following fields:

Read/write permission field: The read/write permission field is used to identify whether the process of the source has read and/or write permission for the memory of the destination.

Cacheable capability field: The cacheable capability field is used to identify whether the CPU of the source may cache data of the destination.

Optionally, the following fields may be further selectively included:

Privilege identification field: The privilege identification field is used to identify a level of permission required for accessing the memory of the destination, for example, whether a memory in a user mode may be accessed or whether a memory in a kernel mode may be accessed.

Identity field: The identity field is used by the destination to perform a security check.

The foregoing process occurs at the source. After the second request is received by the bus end point of the destination, address translation also needs to be performed.

AVA→DPA: The DVA in the AVA has different implementations, and AVA→DPA corresponds to different address translation processes.

When the DVA does not include the identifier of the instance, an EP of the second node is responsible for address translation at this stage. Certainly, an IOMMU of the second node may alternatively be responsible for address translation at this stage. In this case, the EP of the second node is responsible for reading the DVA from the request. A mapping relationship between a DVA and a DPA is stored in the second node, and may be carried in a mapping table, for example, the second mapping table described above. Because AVA→DPA is also translation from a virtual address to a physical address, the second mapping table may also be a page table, and may be considered as a page table of the EP of the second node. The second mapping table needs to be configured by a driver of the EP in advance.

When the DVA includes the identifier of the instance and a virtual address, address translation at this stage includes two sub-processes. First, a table in which the virtual address is located needs to be found based on the identifier of the instance, that is, a mapping table used by the instance. A mapping relationship between an identifier of an instance and an address mapping table of the instance is stored in the second node. Then, a physical address DPA corresponding to the virtual address may be found based on the address mapping table of this instance, for example, the third mapping table described above, to complete address translation at this stage. The third mapping table is configured to store a mapping relationship between a plurality of virtual addresses and a plurality of physical addresses. The plurality of virtual addresses are all virtual addresses that may be carried in the AVA. If the instance is a process, a process page table can be used. Therefore, the identifier of the instance may be an identifier of an address space of the process, and the virtual address is an address in a virtual address space of the process, and is also an offset of a page table base address of the process. In this case, the two mapping relationships are required to translate the AVA into the DPA.

The foregoing process may be that the EP of the destination needs to obtain a base address of a process page table of the process based on the identifier of the address space of the process, and then an IOMMU of the destination searches for the corresponding process page table based on a VA in the DVA, to obtain the DPA corresponding to the AVA. Alternatively, the EP of the destination is responsible for obtaining the DVA from a request through parsing, and a process of obtaining the corresponding DPA from the DVA is executed by the IOMMU of the destination. Alternatively, the EP of the destination may be responsible for obtaining the DVA from a request through parsing, and the IOMMU of the destination does not need to be used in a process of obtaining the corresponding DPA from the DVA. How the destination allocates this process is not limited in this disclosure.

In conclusion, address translation needs to be performed for a total of three times when the source accesses the memory of the destination. In the method in this disclosure, virtual address addressing is embodied in the AVA, and carries the destination virtual address DVA instead of the destination physical address DPA. In addition, specific implementations of the first mapping table, the second mapping table, and the third mapping table are not limited in this disclosure, provided that functions corresponding to the first mapping table, the second mapping table, and the third mapping table can be implemented. Examples in this disclosure are merely for ease of understanding, and do not constitute a limitation.

Figure 2:
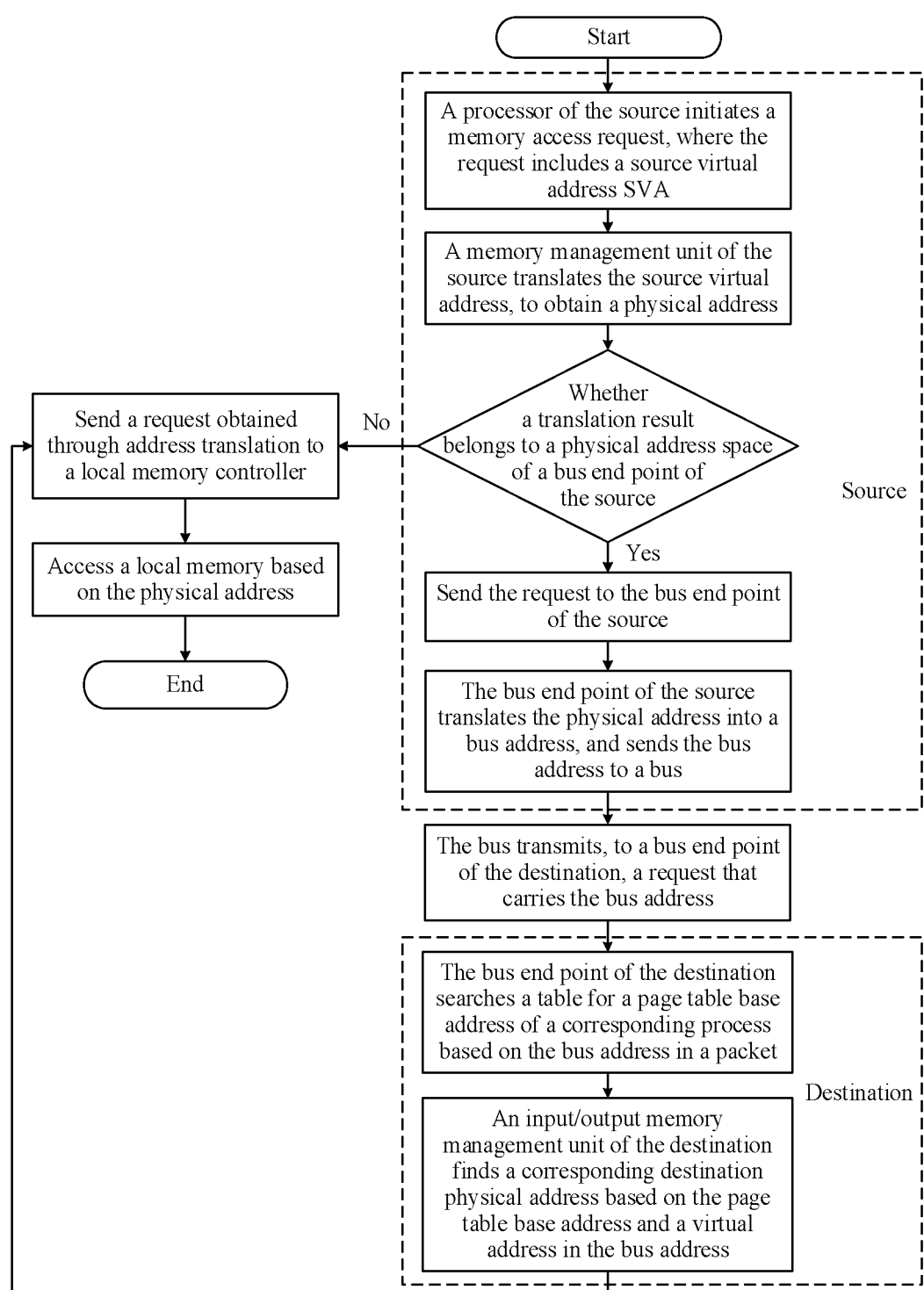
FIG. 2 is a schematic diagram of a procedure in which a source accesses a memory of a destination based on a bus address according to an embodiment of this disclosure.

In an implementation, a procedure in which a source accesses a memory of a destination based on a bus address is shown in FIG. 2. In brief, a CPU of the source initiates a memory access request. The memory access request carries an SVA. An MMU of the source performs address translation based on the SVA, to query whether a physical address corresponding to the SVA is a TPA, that is, whether the physical address corresponding to the SVA belongs to a physical address space of a bus end point of the source. If the physical address corresponding to the SVA is not a TPA, the request is sent to a local memory controller, so that a local memory can be accessed. If the physical address corresponding to the SVA is a TPA, the request is sent to the bus end point of the source for processing. The bus end point of the source sends, to an HPIB, a memory access request (carrying an AVA) obtained after address translation. The HPIB transmits the memory access request to a bus end point of the destination based on a bus end point identifier carried in the received memory access request. The bus end point of the destination parses the received memory access request, finds a corresponding page table base address based on an identifier of an instance in a DVA of the AVA, and sends the page table base address to an IOMMU of the destination. If the IOMMU finds a corresponding DPA based on the page table base address and a VA in the memory access request, a local memory controller of the destination may access the memory of the destination based on the DPA, and read data, or write, to an address indicated by the DPA, data carried in the memory access request. It should be understood that, a branch of "Yes" and a branch of "No" in the figure are finally directed to a local memory controller. In the branch of "Yes", "local" indicates the destination; and in the branch of "No", "local" indicates the source.

In the foregoing address translation process, cross-node memory access may be completed. The memory of the destination may be accessed by the source through the HPIB. In this case, an intra-node memory access instruction may also be used in a cross-node access scenario, to unify the cross-node access scenario and an intra-node access scenario, improve a memory access speed in the cross-node scenario, and reduce a data reading/writing delay. In addition, because the request carries a virtual address rather than a physical address, address translation is performed, so that a physical address that actually needs to be read or written can be accessed in the memory of the destination after a series of processing is performed on the request delivered by the source, and an OS of the destination does not lose a right to manage the memory. In addition, a node other than the source and the destination may perform reading from and writing to the memory, so that real memory sharing is implemented, that is, a segment of memory can be accessed by a plurality of nodes.

Figure 3:
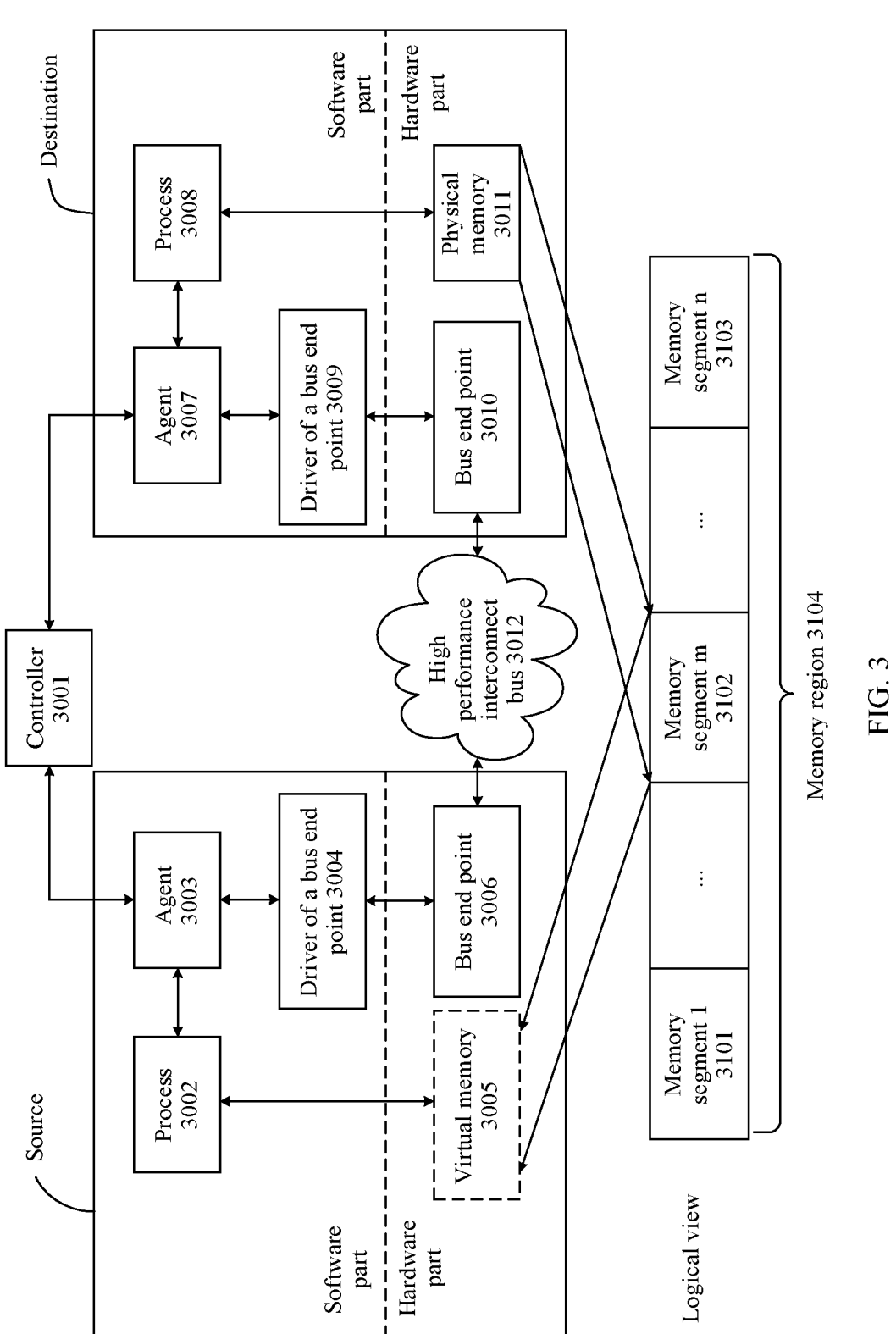
FIG. 3 is a schematic diagram of a shared memory management architecture according to an embodiment of this disclosure.

With reference to FIG. 3, the following briefly describes, by using memory access as an example, how a shared memory in a domain is managed by using a controller and an agent in this disclosure. A physical memory 3011 in FIG. 3 is a memory of a destination, and a virtual memory 3005 is only an example. A domain is a group of nodes that may access a memory of each other by using a solution described in this disclosure. A management process may be described by using two logical concepts, that is, a memory region (MR) and a memory segment (MS). The two concepts are logical, and mean that the two quantities are concepts created for convenience of text description and code description. However, existence forms of real things corresponding to the two quantities are not necessarily as described below.

An MR 3104 is a logical concept or a code-level concept, represents a segment of consecutive virtual addresses, and includes a plurality of MSs (for example, 3101 to 3103 in the figure). Creation of the MR may be initiated by any process on a node in a domain, that is, may be initiated by each of a process on a source and a process on a destination. The MR may be a segment (including a plurality of virtual addresses) in a virtual address space of a process that initiates creation of the MR, or may be another address space in an OS. A controller is configured to maintain an MR directory. For example, the MR directory includes start addresses and lengths of a plurality of MRs. The MR directory is used to record a plurality of MRs in a domain in which the controller is located, so that the controller can manage the MRs in the domain together.

The MS (for example, 3101 to 3103 in the figure) belongs to an MR. In an address space of the MR, a group of quantities, namely, an offset and a length are used as identifiers of an MS. The offset is an offset relative to a start address of the MR, and the length is a length of the MS, that is, a size of the memory segment. Each MS is created by a process, and corresponds to a segment of physical memory whose length is equal to a length of the MS. The DVA or the VA in the DVA described above is related to the offset of the MS.

Based on the foregoing memory model, a process (3008 in the figure) of the destination may share physical memory (3011 in the figure) of the process, so that a process (3002 in the figure) of the source may perform reading from and writing to the physical memory, that is, implement the multi-segment address translation procedure described above. Scattered virtual addresses, that is, MSs, shared by the process of the destination may be managed in a form of consecutive addresses, that is, a form of an MR, so that the virtual addresses can be managed and used more conveniently and simply. The three pieces of semantics described below may be used to implement creation of the MR, creation of the MS, and mapping of the MS, and include three pieces of independent semantics. The three pieces of semantics each may be understood as an implementation that needs to be prepared to implement the multi-segment address translation procedure described above.

Semantics 1: Create the MR (Semantics 1 may be used by the source or the destination, and is used to create an MR).

An implementation of Semantics 1 includes the following steps:

(a) A process (for example, 3002 in the figure) initiates, to a local agent (for example, 3003 in the figure), a request for creating an MR (for example, 3104 in the figure).

(b) The agent (for example, 3003 in the figure) transmits the request to a controller (for example, 3001 in the figure).

(c) The controller (for example, 3001 in the figure) approves or rejects the request, and returns a result to the agent (for example, 3003 in the figure).

(d) The agent (for example, 3003 in the figure) returns the result to the process (for example, 3002 in the figure). If controller approves the request, the MR is successfully created.

Semantics 2: Create the MS (the destination is configured to create an MS, where the MS belongs to the previously created MR; for example, an AVA includes an identifier of a process, that is, an ASID).

An implementation of Semantics 2 includes the following steps:

(a) The process (for example, 3008 in the figure) of the destination applies for a segment of virtual address, where the segment of address is indicated by using a DVA and a length, and applies, in the memory at the destination, for a segment of physical address (for example, 3011 in the figure) corresponding to the segment of virtual address.

(b) The process of the destination (3008 in the figure) initiates, to an agent (for example, 3007 in the figure) of the destination, a request for creating a memory segment m (for example, 3102 in the figure), and attaches an identifier of the MR (for example, 3104 in the figure) and information about the virtual address segment, that is, the DVA and the length to the request.

(c) The agent (for example, 3007 in the figure) of the destination transmits the request to the controller (for example, 3001 in the figure).

(d) The controller (for example, 3001 in the figure) approves or rejects the request, and returns a result to the agent (for example, 3007 in the figure) of the destination.

(e) If the controller approves the request, the agent (for example, 3007 in the figure) of the destination notifies an EP driver (for example, 3009 in the figure) of the destination to add a corresponding entry to a mapping table between the ASID and a page table base address, for example, the foregoing third mapping table. If a reported DVA is not a virtual address of the process (for example, 3008 in the figure), but a customized virtual address, the agent (for example, 3007 in the figure) notifies the EP driver (for example, 3009 in the figure) to add a corresponding entry to a page table of an EP (for example, 3010 in the figure) of the destination, that is, the foregoing second mapping table. The entry indicates a mapping relationship between a DVA and a DPA.

(f) The agent (for example, 3007 in the figure) of the destination returns, to the process (for example, 3008 in the figure) that is of the destination and that initiates the request, a result indicating that addition is completed.

Semantics 3: Map the MS.

Mapping the MS is a process that notifies the source of information about an MS registered by the process of the destination, so that the process of the source performs mapping between the information and a segment of physical address in a physical address space of the process. In this way, the process of the source can access a physical address segment that is of the process of the destination and that corresponds to the MS. The physical address space of the process belongs to the bus end point, rather than the memory. Therefore, the process (for example, 3002 in the figure) of the source in FIG. 3 is mapped onto the virtual memory 3005 (represented by a dashed line) of a hardware part, only to be symmetrical to the destination in the figure. In addition, for illustration, a physical address space corresponding to the process 3002 of the source is not in a physical memory of the source.

An implementation of Semantics 3 includes the following steps:

(a) The process (for example, 3002 in the figure) of the source allocates a segment of virtual address in a virtual address space of the process, and identifies the segment of virtual address by using an SVA and a length. The segment of virtual address also corresponds to a segment of physical address in the physical memory (for example, 3011 in the figure) of the destination. For a representation manner of a correspondence between a virtual address and a physical address, refer to the address translation process of SVA→DPA described above.

(b) The process (for example, 3002 in the figure) of the source initiates, to the agent (for example, 3003 in the figure) of the source, a request for mapping the memory segment m (for example, 3102 in the figure) in the MS. Herein, the request is a request for mapping, onto the memory segment m (for example, 3102 in the figure), the virtual address segment allocated in step (a).

(c) The agent (for example, 3003 in the figure) of the source transmits the request to a controller (for example, 3001 in the figure).

(d) The controller (for example, 3001 in the figure) approves or rejects the request, and returns a result to agent (for example, 3003 in the figure) of the source.

(e) If controller approves the request, the agent (for example, 3003 in the figure) of the source notifies an EP driver (for example, 3004 in the figure) of the source to configure a mapping table (that is, a table required for two times of address translation of SVA→TPA and TPA→AVA) of the source, and sends a configuration result to the process (for example, 3002 in the figure) that is of the source and that initiates the request for mapping the memory segment m in the MS in step (b).

A procedure of configuring a table of the source is as follows:

1. The EP driver (for example, 3004 in the figure) of the source fills a corresponding page entry in a page table of the process (for example, 3002 in the figure) of the source with a physical address (for example, a TPA) corresponding to an address segment whose length is length in a physical address space of the bus end point.

2. The EP driver (for example, 3004 in the figure) of the source updates a table (that is, the foregoing first mapping table) of TPA→AVA, and fills the table with a corresponding entry.

In this way, the process (for example, 3008 in the figure) of the destination shares the memory (for example, 3011 in the figure) by creating the MS (for example, 3102 in the figure). The process (for example, 3002 in the figure) of the source enables access to a remote memory (3011 in the figure) by mapping the MS (for example, 3102 in the figure). The MS (for example, 3102 in the figure) may be simultaneously mapped by processes of a plurality of nodes, so that the physical memory (for example, 3011 in the figure) can be simultaneously accessed by the plurality of nodes, to achieve real memory sharing.

Figure 4:
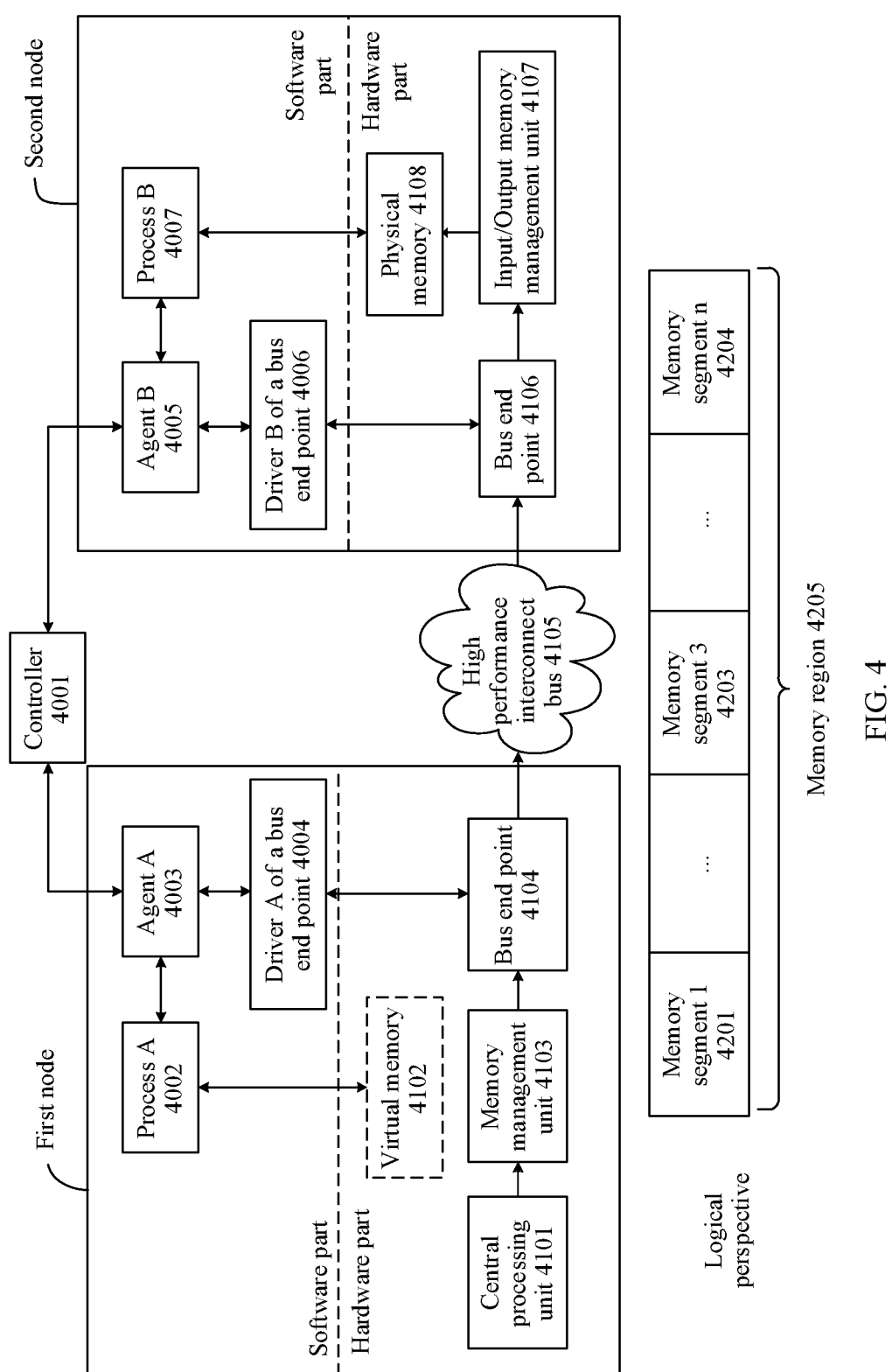
FIG. 4 is a schematic diagram of a structure of a device according to an embodiment of this disclosure.

With reference to FIG. 4, the following describes an embodiment of a request processing method in this disclosure. This embodiment includes: a process 4002 in a first node accesses, through an HPIB 4105 based on memory semantics, a physical memory 4108 provided by a process B 4007 in a second node. In this access process, the first node may be referred to as a source, and the second node may be referred to as a destination. In this embodiment, communication between the first node and the second node is used as an example. Another node may communicate with the first node or the second node by using a process similar to the following process. The first node and the second node belong to a same domain, and the domain may further include several other nodes. In the domain, identifiers EPIDs of all bus end points are different. For brevity, an overall execution process of the method is briefly described in this embodiment. For specific descriptions of related nouns and sub-processes, refer to the foregoing corresponding content.

Before the process A 4002 sends a read request or a write request, a shared memory needs to be registered by using software. In other words, a related mapping table needs to be configured. In this embodiment, a process of configuring a related mapping table (a corresponding DVA includes an ASID and a VA) is described by using a configuration of the process A 4002 and a configuration of the process B 4007 as an example. The process is also applicable to another instance related to the process. It should be understood that, in a configuration process before cross-node memory access is implemented, the two processes and nodes in which the two processes are located do not have both an identity of the source or an identity of the destination. An initialization process may include the following steps:

1. Initialize the process B 4007.
   (a) An agent B 4005 allocates a unique identifier in the second node to the process B 4007, that is, an ASID of the process B.
   (b) The agent B 4005 notifies a driver B 4006 of a bus end point to add a corresponding entry to a corresponding table (for example, the foregoing third mapping table) between an ASID and a page table base address. In this embodiment, a page table base address corresponding to the ASID is a process page table base address of the process B 4007.
2. The process B 4007 completes creation of a memory region 4205 based on Semantics 1.
3. The process B 4007 creates a memory segment based on the memory region 4205 and Semantics 2. The memory segment is a memory segment 3 4203.
4. Complete, based on Semantics 3, a process in which the process A 4002 maps the memory segment 3 4203. The process is related to a virtual memory 4102 (represented by a dotted line box) in the figure.

A controller 4001, an agent A 4003, and the agent B 4005 need to be used in the process, and may be understood with reference to the foregoing descriptions of the three pieces of semantics and reference to FIG. 3 and FIG. 4. This is not expanded herein. In addition, a process of another node in a cluster or another process of the second node may also create another memory segment that belongs to the memory region 4205, for example, a memory segment 1 4201 or a memory segment n 4204.

After the configuration, a process that runs in a CPU 4101 of the first node may access an address segment in the physical memory 4108 of the second node based on configured entry. The following provides descriptions by using an example in which a bus address AVA includes a bus end point identifier EPID, an identifier ASID of an address space of the process, and a virtual address VA in virtual space of the process and a request is used to read data. In FIG. 4, an arrow of a connecting line indicates a request processing process in a hardware part, and a request is sent by the CPU 4101, until a read instruction corresponding to the request arrives at the physical memory 4108 and corresponding data is read. An access procedure includes the following steps:

1. The process A 4002 runs in the CPU 4101 of the first node, generates a read request (for example, the foregoing first request), and sends the read request to an MMU 4103. The read request includes an address, that is, an SVA, in a virtual address space of the process A 4002.
2. The MMU 4103 of the first node converts the SVA into a corresponding physical address, that is, a TPA, based on a process page table of the process A 4002.
3. A bus end point 4104 of the first node converts the TPA into a corresponding AVA based on a mapping relationship between a TPA and an AVA. For example, the mapping relationship is carried in the first mapping table described above.
4. The bus end point 4104 of the first node sends a request (for example, the foregoing second request) including the AVA to the HPIB 4105.
5. The HPIB 4105 sends the request including the AVA to the bus end point 4106 of the second node based on the bus end point identifier EPID in the AVA (an EPID in the second request indicates a bus end point 4106 of the second node).
6. The bus end point 4106 receives the request, parses out an ASID in the AVA (the ASID corresponds to the process B 4007), and obtains a process page table base address of the process B 4007 based on a correspondence between an ASID and a process page table base address. The correspondence between an ASID and a process page table base address is carried in a mapping table, for example, the foregoing third mapping table. The mapping table may also be a page table.
7. The bus end point 4106 sends the read instruction in the request and the obtained process page table base address of the process B 4007 to an IOMMU 4107.
8. The IOMMU 4107 obtains a physical address corresponding to a virtual address VA in the AVA based on the process page table base address of the process B 4007 and the virtual address VA, and accesses the physical memory 4108 based on the physical address and the read instruction, to read data that the request sent by the first node indicates to read.
9. After the second node reads corresponding data, the bus end point 4106 sends the data to the first node through a bus (the bus is the HPIB 4105).

Cross-node memory access is completed in the foregoing process. A memory of the second node may be accessed by the first node through a bus. An intra-node memory access instruction may also be used in a cross-node scenario. In the foregoing process, the cross-node access scenario and an intra-node access scenario are unified, a memory access speed in the cross-node scenario is improved, and a data reading/writing delay is reduced. In addition, because the read request and the write request each carry a virtual address rather than a physical address, address translation is performed, so that a physical address that needs to be read or written in the memory of the second node can be accessed in the memory of the second node after a series of processing is performed on the read request and the write request delivered by the process of the first node, and an OS of the second node does not lose a right to manage the memory. In other words, when the first node can perform reading from and writing to the memory, the process B 4007 of the second node may also read and write the memory. In addition, a node other than the first node and the second node may also perform reading from or writing to the memory, so that real memory sharing is implemented.

Figure 5A:
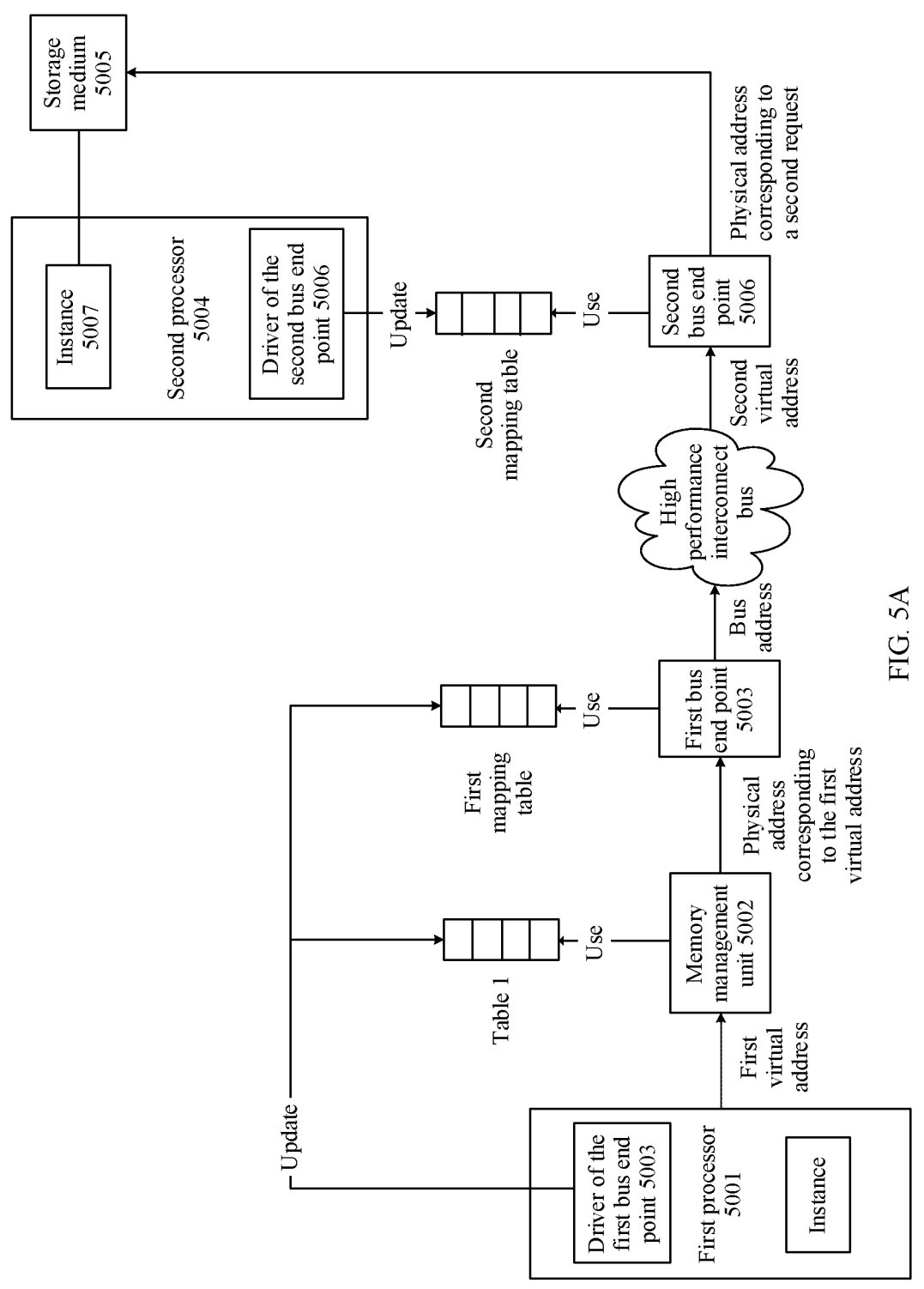
FIG. 5A is a schematic diagram of an architecture of a request processing system according to an embodiment of this disclosure.
Figure 5B:
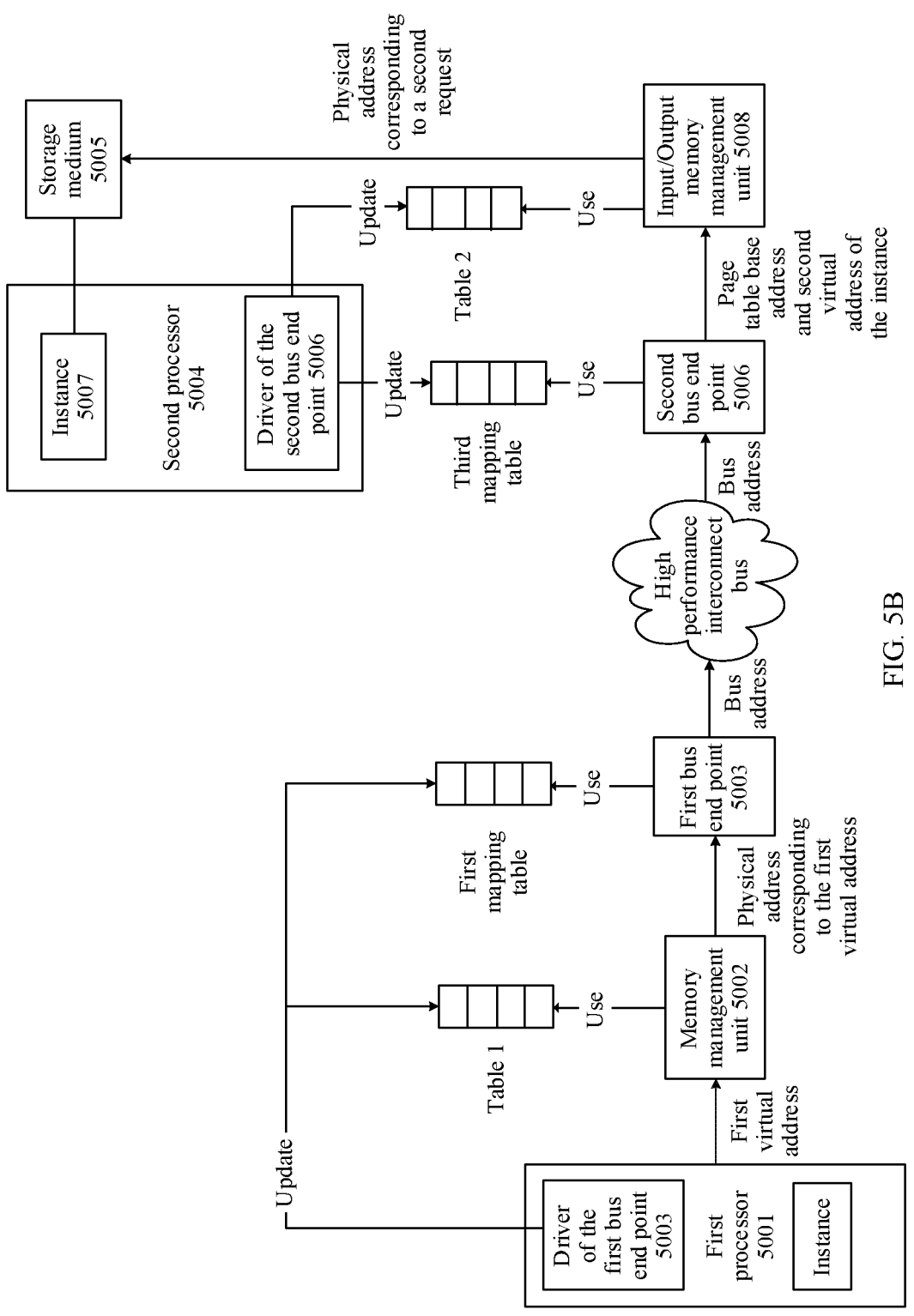
FIG. 5B is a schematic diagram of another architecture of a request processing system according to an embodiment of this disclosure.

From a perspective of a system, the following describes how a request for reading data or writing data is processed by a plurality of components in a system after the request is generated by a processor, to finally obtain a request processing result. The foregoing descriptions of various words or sentences are also applicable if the words or sentences are used below, and are not repeated. FIG. 5A and FIG. 5B are schematic diagrams of two architectures of a system. The system is configured to process a request. Systems shown in FIG. 5A and FIG. 5B each include a first processor 5001, an MMU 5002, a first bus end point 5003, a second processor 5004, a storage medium 5005, and a second bus end point 5006. The second processor runs an instance 5007, and a physical address space of the instance 5007 points to the storage medium 5005. Certainly, the systems described in FIG. 5A and FIG. 5B are two examples. Actually, each component in FIG. 5A and FIG. 5B may be an independent component shown in the figure, or two or more components may be integrated together. A specific implementation and layout manner of each component are not limited in this disclosure. For example, the second bus end point 5006 and an IOMMU 5008 may be packaged in one component. For another example, the first processor 5001, the MMU 5002, and the first bus end point 5003 are integrated into one chip.

The first processor 5001 and the second processor 5004 each may include one or more processing units. The first processor 5001 may be a CPU, a GPU, an application-specific integrated circuit (ASIC), or one or more integrated circuits configured to perform a function of the first processor 5001 in this embodiment of this disclosure. This is not limited in this disclosure. The second processor 5004 may also be a CPU, a GPU, an ASIC, or one or more integrated circuits configured to perform a function of the second processor 5004 in this embodiment of this disclosure. This is not limited in this disclosure.

The first bus end point 5003 and the second bus end point 5006 are configured to communicate with another bus end point. In this embodiment of this disclosure, the first bus end point 5003 and the second bus end point 5006 each may be a module, a circuit, an interface, or another apparatus that can implement a communication function. Optionally, a bus end point may include an independently disposed transmitter, where the transmitter may be configured to send information through an HPIB, and an independently disposed receiver, configured to receive the information from the HPIB. A bus end point may also be a part that integrates an information sending function and an information receiving function, and even includes a simple processing and storage resource, to support a function of using a mapping table. A specific implementation of the bus end point is not limited in this embodiment of this disclosure.

The storage medium 5005 may be a read-only memory (ROM) or another type of storage module that may store static information and instructions, or a random-access memory (RAM) or another type of storage module that may dynamically store information and instructions, or may be an electrically erasable programmable read-only memory (EEPROM) or another magnetic storage device. A component in which the storage medium 5005 is located may exist independently, and is connected to the second processor 5004 through a bus in a device. The bus may be a Peripheral Component Interconnect (PCI) bus, an Extended Industry Standard Architecture (EISA) bus, or the like. The storage medium 5005 may also be integrated with the second processor 5004.

It should be noted that, that a physical address space of an instance points to a storage medium means that a physical address that may be used by the instance belongs to the storage medium, or a physical storage resource that can be used by the instance is a part of the storage medium.

The MMU 5002 is configured to obtain a physical address corresponding to a first virtual address based on a first request from the first processor 5001. The first request is used to request to read data or request to write data, and the first request includes the first virtual address. The first bus end point 5003 is configured to send a second request to the second bus end point 5006 based on a first mapping relationship. The first mapping relationship is a mapping relationship between the physical address and a bus address, the second request corresponds to the first request, the second request includes the bus address, and the bus address indicates a virtual address corresponding to the instance 5007. The second bus end point 5006 is configured to receive the second request. The second bus end point 5006 is further configured to process the second request based on the bus address and a second mapping relationship, to obtain a result corresponding to the request. The second mapping relationship is a mapping relationship between the bus address and a physical address corresponding to the second request, and the physical address corresponding to the second request belongs to a physical address space of the instance 5007.

A connection relationship between components may be embodied by a request processing process in the previous paragraph. A request processing direction (from 5001 to 5007) is schematically shown in FIG. 5A. The system does not limit a combination form of the components. For example, in an implementation, it may be considered that components (5001 to 5006) are packaged in a same physical machine, different OSs run on the first processor 5001 and the second processor 5004, and the first processor 5001 and the second processor 5004 may be different types of processors. In another implementation, the first processor 5001, the MMU 5002, and the first bus end point 5003 are located in one physical machine, and the second processor 5004, the storage medium 5005, and the second bus end point 5006 are located in another physical machine. The first bus end point 5003 and the second bus end point 5006 are connected through a bus.

In this case, the storage medium 5005 used by the second processor 5004 may be accessed by the first processor 5001, a memory access instruction in an OS may be used, and a data reading and writing relay is reduced. In addition, because a request carries a virtual address rather than a physical address, address translation is performed, so that a physical address that is in the storage medium 5005 and that is used by the second processor 5004 can be accessed after a series of processing is performed on a request delivered by the first processor 5001, and the second processor 5004 does not lose a right to manage and use the physical address. In other words, when the first processor 5001 can access a segment of physical address in the storage medium 5005, the second processor 5004 may also read and write the segment of physical address. Even a processor other than the first processor 5001 and the second processor 5004 may read and write the segment of physical address, so that real storage medium sharing is implemented.

The physical address is an address in a physical address space corresponding to the first bus end point 5003.

In an implementation, the first processor 5001 is further configured to run a driver of the first bus end point 5003, and the driver of the first bus end point 5003 is configured to update a first mapping table in which the first mapping relationship is located.

The driver of the first bus end point 5003 is configured to: obtain at least one bus address corresponding to the storage medium 5005, and update the first mapping table based on the obtained at least one bus address corresponding to the storage medium 5005, so that the updated first mapping table includes at least one entry that corresponds to the at least one bus address corresponding to the storage medium 5005. The driver of the first bus end point 5003 is further configured to configure (including updating) a correspondence between the first virtual address and the physical address corresponding to the first virtual address. The correspondence may be stored in a mapping table. The mapping table may be a page table. In FIG. 5A, the mapping table is indicated as Table 1. It can be learned that the MMU 5002 uses Table 1, to convert the first virtual address in the first request into a corresponding physical address.

In an implementation, the bus address includes an identifier of the second bus end point 5006 and a second virtual address, and the second virtual address is related to the instance 5007. The second mapping relationship is a mapping relationship between the second virtual address and the physical address corresponding to the request. For example, the second virtual address is the customized DVA mentioned above or is the VA in the DVA described above, and belongs to a virtual address space of an instance 5007.

In an implementation, the second processor 5004 is further configured to run a driver of the second bus end point 5006. The driver of the second bus end point 5006 is configured to: obtain an address allocation request of the instance 5007, where the address allocation request indicates that the instance 5007 provides the physical address space corresponding to the instance 5007; and update, based on the address allocation request, a mapping table in which the second mapping relationship is located, so that the mapping table in which the updated second mapping relationship is located includes at least one entry that corresponds to the physical address space corresponding to the instance 5007. It should be understood that, the instance 5007 may provide all or a part of the physical address space.

FIG. 5A shows a case in which the bus address (the foregoing AVA) includes the identifier of the second bus end point 5006 and the second virtual address, that is, the AVA includes an EPID and a virtual address, that is, a DVA. The DVA may be globally unique in the second node. FIG. 5A also shows the plurality of address translation processes described above.

FIG. 5B shows another implementation. To be specific, the bus address further includes an identifier of the instance 5007. Correspondingly, the second mapping relationship is different from that in the implementation corresponding to FIG. 5A. The second mapping relationship includes mapping between the identifier of the instance 5007 and a page table base address of the instance 5007 and mapping between the second virtual address and the physical address corresponding to the request, and the mapping between the second virtual address and the physical address corresponding to the second request is recorded in a page table of the instance 5007. The page table of the instance 5007 is shown as Table 2 in FIG. 5B.

Correspondingly, an address translation process in the second node is also different from that in FIG. 5A. The system shown in FIG. 5B further includes the IOMMU 5008, and the IOMMU 5008 is configured to: find the physical address corresponding to the second request based on the page table of the instance 5007, which is shown as Table 2 in FIG. 5B, to perform an operation corresponding to the second request, and return a result (for example, read data or a feedback used to indicate that data is successfully written) of the operation to the second bus end point. Correspondingly, the second bus end point 506 is configured to: find the page table of the instance 5007 based on the bus address and the mapping between the identifier of the instance 5007 and the page table base address of the instance 5007, and transfer page table information (for example, the page table base address) of the instance 5007 to the IOMMU 5008.

Certainly, the system may always include the IOMMU 5008, and is compatible with the two implementations. FIG. 5A and FIG. 5B merely show two possible implementations. In an actual application, some implementation details may be slightly different from that of manners shown in FIG. 5A and FIG. 5B. This is not limited in this disclosure. For example, FIG. 5A shows a case in which the second bus end point 5006 converts the second virtual address into the physical address corresponding to the second request based on the second mapping table. In an actual implementation, the IOMMU 5008 may convert the second virtual address into the physical address corresponding to the second request based on the second mapping table, and the second bus end point 5006 is only configured to: receive the second request, and read the second virtual address from the second request. For another example, FIG. 5B shows a case in which the second bus end point 5006 finds a page table base address corresponding to an identifier of an instance in the bus address in the second request based on a third mapping table, and then transfers the page table base address and the second virtual address in the bus address to the IOMMU 5008. The IOMMU 5008 searches Table 2, to obtain a corresponding physical address. In an actual implementation, the two times of address translation may be both completed by the second bus end point 5006. In other words, the second bus end point 5006 searches the third mapping table and Table 2, without a need to use the IOMMU 5008. In an actual implementation, the two times of address translation may also be both completed by the IOMMU 5008. To be specific, the second bus end point 5006 is only configured to: receive the second request, and read the identifier of the instance and the second virtual address from the second request. The IOMMU 5008 searches the third mapping table based on the identifier of the instance, to obtain the page table base address, and then searches Table 2, to obtain the physical address corresponding to the second request.

Figure 6:
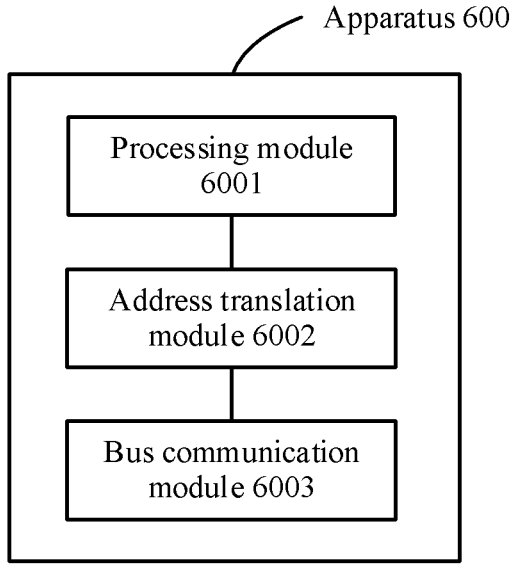
FIG. 6 is a schematic diagram of a request processing apparatus (corresponding to a first node) according to an embodiment of this disclosure.

FIG. 6 is a schematic diagram of an architecture of an apparatus for performing the foregoing request processing method. FIG. 6 corresponds to the foregoing source, or it may be referred to as that an apparatus 600 described in FIG. 6 is located in the foregoing first node. The apparatus 600 includes a processing module 6001, where the processing module 6001 is configured to send a first request to an address translation module 6002, and the first request is used to request to read data of a second node or request to write data to a second node, where the address translation module 6002 is configured to obtain a corresponding physical address based on a first virtual address, where the first virtual address is a virtual address in the first request; and a bus communication module 6003, configured to send a second request to the second node based on a first mapping relationship, where the first mapping relationship is a mapping relationship between the physical address and a bus address, the second request corresponds to the first request, the second request includes the bus address, and the bus address indicates a virtual address corresponding to an instance of the second node.

The apparatus 600 is configured to perform the foregoing request processing method, and particularly, corresponds to the foregoing method executed by the source or the first node. Therefore, for specific implementations, descriptions, and technical effects, refer to the foregoing corresponding paragraphs. Details are not described herein again. The apparatus 600 may be a first node, or may be a part of the first node. Specific implementations of the foregoing modules are not limited in this disclosure. For example, the foregoing modules may be integrated into one module for an implementation. For another example, the processing module 6001 may be a processor or a controller, for example, may be a CPU, a general-purpose processor, a digital signal processor (DSP), an ASIC, a field programmable gate array (FPGA) or another programmable logic device, a transistor logic device, a hardware part, or any combination thereof. The processing module may implement or execute various example logical blocks, modules, and circuits described with reference to content disclosed in this disclosure. The processor may alternatively be a combination for implementing a computing function, for example, a combination including one or more microprocessors or a combination of a DSP and a microprocessor.

For another example, the address translation module 6002 may be the MMU described above.

For another example, the bus communication module 6003 may be the bus end point described above, and the bus end point is configured to: enable the apparatus to access an HPIB, and receive and send information.

Figure 7:
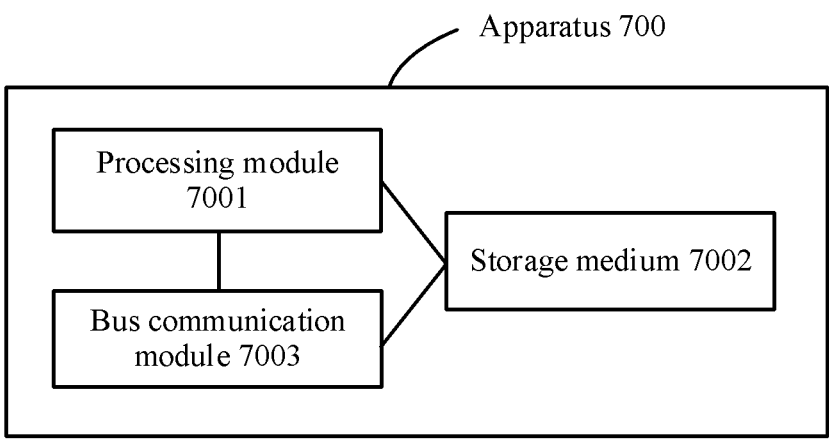
FIG. 7 is a schematic diagram of another request processing apparatus (corresponding to a second node) according to an embodiment of this disclosure.

FIG. 7 is a schematic diagram of an architecture of an apparatus for performing the foregoing request processing method. FIG. 7 corresponds to the foregoing destination, or it may be referred to as that an apparatus 700 described in FIG. 7 is located in the foregoing second node. The apparatus includes: a processing module 7001 and a storage medium 7002, where the processing module 7001 is configured to run an instance, and a physical address space of the instance points to the storage medium 7002; and a bus communication module 7003, configured to receive a request from a first node, where the request is used to read data or is used to write data, the request includes a bus address, and the bus address indicates a virtual address corresponding to the instance; and further configured to process a second request based on the bus address and a second mapping relationship, to obtain a result corresponding to the request, where the second mapping relationship is a mapping relationship between the bus address and a physical address corresponding to the request, and the physical address corresponding to the request belongs to physical address space of the instance.

It should be noted that, that the physical address space of the instance points to the storage medium means that a physical address that may be used by the instance belongs to the storage medium, or a physical storage resource that can be used by the instance is a part of the storage medium.

The apparatus 700 is configured to perform the foregoing request processing method, and particularly, corresponds to the foregoing method executed by the destination or the second node. Therefore, for specific implementations, descriptions, and technical effects, refer to the foregoing corresponding paragraphs. Details are not described herein again. The apparatus may be a second node, or may be a part of the second node. Specific implementations of the foregoing modules are not limited in this disclosure. For example, the foregoing modules may be integrated into one module for an implementation. For some specific implementations of the processing module 7001, refer to the foregoing descriptions of the processing module 6001.

For another example, the storage medium 7002 may be a memory or another type of storage.

For another example, the bus communication module 7003 may be the bus end point described above, and the bus end point is configured to: enable the apparatus to access an HPIB, and receive and send information.

Certainly, with reference to the foregoing descriptions, in some implementations, the apparatus 700 may further include an address translation module (not shown in the figure), configured to translate the virtual address into the physical address by using a page table of the instance. The address translation module may be the IOMMU described above.

Figure 8:
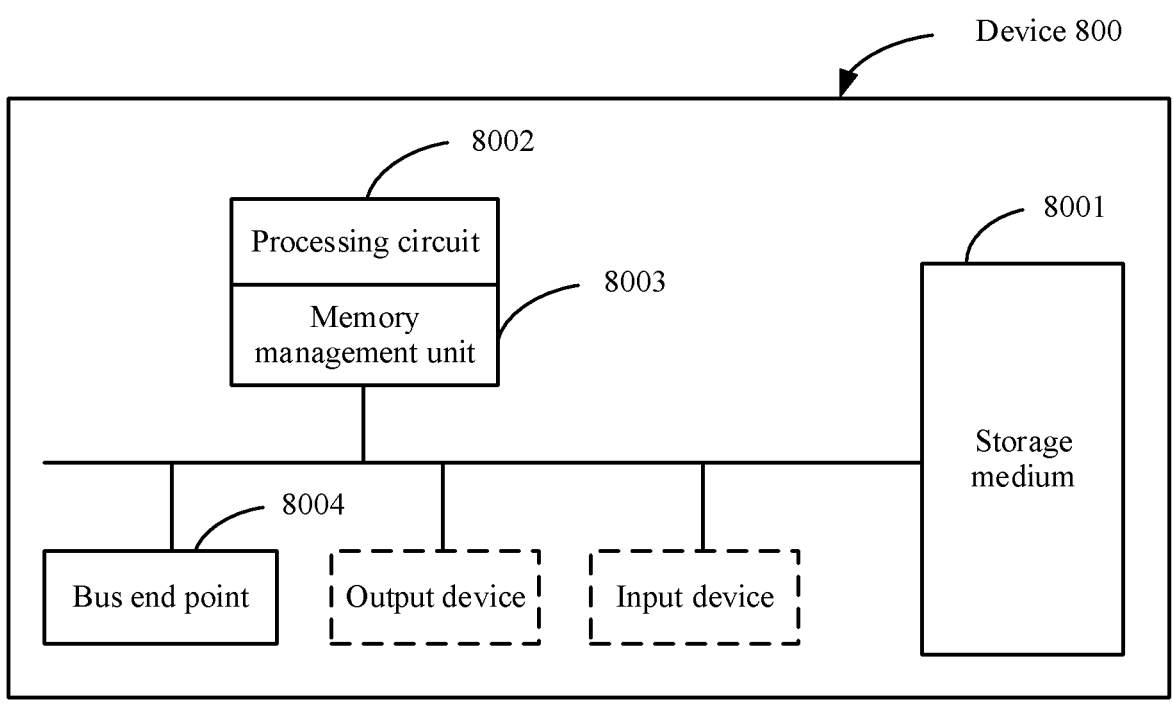
FIG. 8 is a schematic diagram of a request processing device (corresponding to a first node) according to an embodiment of this disclosure.

FIG. 8 is a schematic diagram of a possible logical structure of a request processing device according to an embodiment of this disclosure. A device 800 includes a storage medium 8001, a processing circuit 8002, an MMU 8003, and a bus end point 8004. The storage medium 8001 is coupled to the processing circuit 8002. The storage medium 8001 is configured to store computer program code and data. The computer program code includes computer instructions. When the computer instructions are executed by the processing circuit 8002, the processing circuit 8002 may perform the foregoing method together with the MMU 8003 and the bus end point 8004. The processing circuit 8002 is configured to control and manage an action of the device 800, and the bus end point 8004 is configured to support the device 800 to communicate with another device through a bus (for example, an HPIB). The MMU 8003 is configured to obtain a corresponding physical address based on a first virtual address. The first virtual address is a virtual address in a first request, and the first request is used to request to read data of another device or request to write data to another device. The bus end point 8004 is configured to send a second request to the other device based on a first mapping relationship. The first mapping relationship is a mapping relationship between the physical address and a bus address, the second request corresponds to the first request, the second request includes the bus address, and the bus address indicates a virtual address corresponding to an instance of the other device.

The processing circuit 8002 may be a CPU, a graphics processor, a general-purpose processor, a DSP, an ASIC, an FPGA, or another programmable logic device, a transistor logic device, a hardware part, or any combination thereof. The processing module may implement or execute various example logical blocks, modules, and circuits described with reference to content disclosed in this disclosure. The processing circuit 8002 may alternatively be a combination for implementing a computing function, for example, a combination including one or more microprocessors or a combination of a DSP and a microprocessor. The storage medium 8001 may be a ROM or another type of storage module that may store static information and instructions, or a RAM or another type of storage module that may dynamically store information and instructions, or may be an EEPROM or another magnetic storage device.

The storage medium 8001, the processing circuit 8002, and the bus end point 8004 may be connected through a bus. FIG. 8 shows a case in which the MMU 8003 and the processing circuit 8002 are packaged together, the MMU 8003 and the processing circuit 8002 are electrically connected, the MMU 8003 directly accesses the bus, and the processing circuit 8002 is connected to the MMU 8003. In an actual device, the MMU 8003 may alternatively be an independent component, or the processing circuit 8002 and the MMU 8003 are packaged together, and the processing circuit 8002 directly accesses the bus. A layout manner of various parts of the device 800 is not limited in this disclosure. The bus herein is a bus in the device, and may be a PCI bus, an EISA bus, or the like. Buses may be classified into an address bus, a data bus, a control bus, and the like. For ease of representation, the bus is represented by using only one thick line in FIG. 8. However, it does not mean that there is only one bus or only one type of bus in the device 800.

The device 800 corresponding to FIG. 8 may be a device in which the foregoing source or the foregoing first node is located, or the foregoing source or the first node, and is configured to perform the foregoing method performed by the foregoing source or the first node. Therefore, for specific implementations, descriptions, and technical effects, refer to corresponding paragraphs of the foregoing method, apparatus, and system. Details are not described herein again. For example, in an implementation, the storage medium 8001 may be the foregoing memory 1006, the processing circuit 8002 may be the foregoing CPU 1004, the MMU 8003 corresponds to the MMU 1005, and the bus end point 8004 corresponds to the bus end point 1008.

Figure 9:
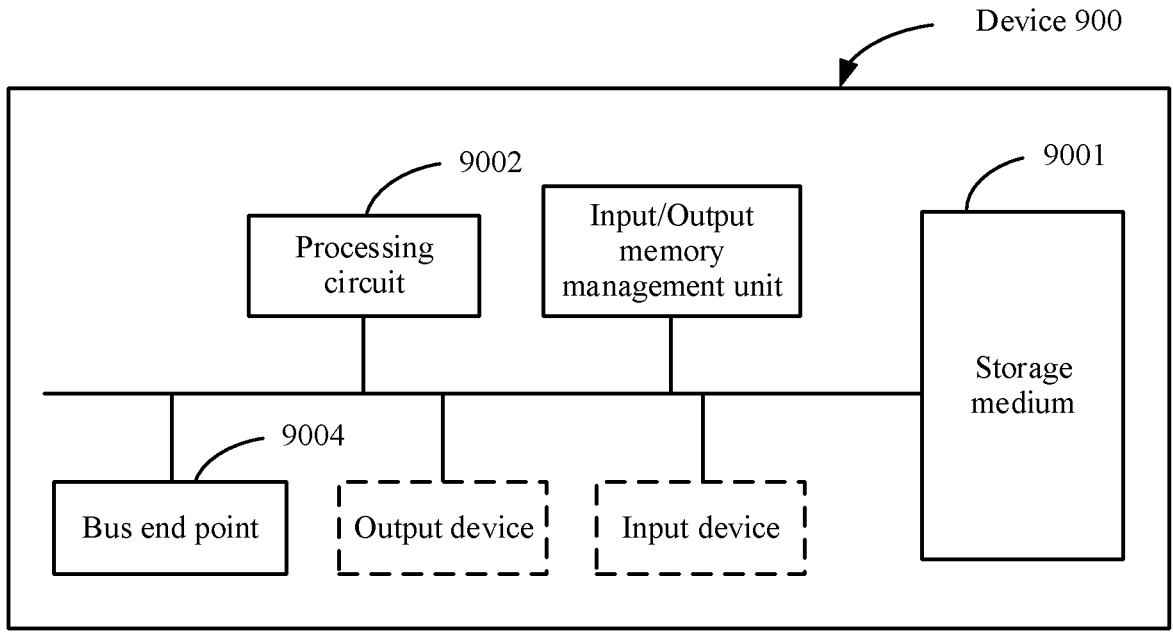
FIG. 9 is a schematic diagram of another request processing device (corresponding to a second node) according to an embodiment of this disclosure.

FIG. 9 is a schematic diagram of a possible logical structure of a request processing device according to an embodiment of this disclosure. A device 900 includes a storage medium 9001, a processing circuit 9002, and a bus end point 9003. The storage medium 9001 is coupled to the processing circuit 9002. The storage medium 9001 is configured to store computer program code. The computer program code includes computer instructions. When the computer instructions are executed by the processing circuit 9002, the bus end point 9003 is indicated to perform the following method: receiving a request from another device, where the request is used to read data of the device or is used to write data to the device, where the request includes a bus address, and the bus address indicates a virtual address corresponding to an instance of the device; and obtaining a physical address corresponding to the request in a storage medium of the device based on the bus address and a second mapping relationship, to perform an operation indicated by the request, where the second mapping relationship is a mapping relationship between the bus address and the physical address corresponding to the request.

For some specific implementations of the processing circuit 9002, refer to the foregoing descriptions of the processing circuit 8002. The processing circuit 9002 is configured to run an instance, and the run instance may share, with another device for use, one or more segments of physical memories that may be used by the instance. For some specific implementations of the storage medium 9001, refer to the foregoing descriptions of the storage medium 8001.

The storage medium 9001, the processing circuit 9002, and the bus end point 9003 may be connected through a bus. The bus herein is a bus in the device, and may be a PCI bus, an EISA bus, or the like. Buses may be classified into an address bus, a data bus, a control bus, and the like. For ease of representation, the bus is represented by using only one thick line in FIG. 9. However, it does not mean that there is only one bus or only one type of bus in the device 900.

The device 900 corresponding to FIG. 9 may be a device in which the foregoing destination or the foregoing second node is located, or the foregoing destination or the second node, and is configured to perform the foregoing method performed by the foregoing destination or the second node. Therefore, for specific implementations, descriptions, and technical effects, refer to corresponding paragraphs of the foregoing method, apparatus, and system. Details are not described herein again. For example, the storage medium

9001 may be the foregoing memory 1006, the processing circuit 9002 may be the foregoing CPU 1004, and the bus end point 9004 may be the bus end point 1008 described above. In addition, the device 900 may further include an IOMMU. The input/output memory management unit is the IOMMU 1007 described above. In this case, when the bus address includes an identifier of the instance, the IOMMU 1007 may be used to perform an address query, to find the requested physical address. FIG. 9 shows an example of a layout manner in which the IOMMU is connected to another component (for example, the processing circuit 9002) through a bus. Actually, the IOMMU and a component in FIG. 9 may alternatively be packaged together, and are electrically connected through a line. This is not limited in this disclosure.

In an embodiment, the device 800 and/or the device 900 each may include a plurality of processors. Each of the processors may be a single-core processor, or may be a multi-core processor. The processor herein may be one or more devices, circuits, and/or processing cores configured to process data (for example, computer program instructions). In addition, the computer program code in this embodiment of this disclosure may also be briefly referred to as a computer program or code, or another name. The computer instruction may also be briefly referred to as an instruction or a command. This is not limited in this embodiment of this disclosure.

In addition, a person skilled in the art may understand that the device 800 may include fewer or more parts than those shown in FIG. 8. FIG. 8 shows only parts that are more related to the plurality of implementations disclosed in embodiments of the present disclosure. Similarly, the device 900 may also include fewer or more parts than those shown in FIG. 9. FIG. 9 shows only parts that are more related to the plurality of implementations disclosed in embodiments of the present disclosure. In an embodiment, the device 800 and/or the device 900 may further include an output device and an input device. The output device communicates with the foregoing processing circuit (for example, the processing circuit 8002 or the processing circuit 9002), and may display information in a plurality of manners. For example, the output device may be a liquid crystal display (LCD), a light emitting diode (LED) display device, a cathode ray tube (CRT) display device, or a projector. When communicating with the processor, the input device may receive an input from a user in a plurality of manners. For example, the input device may be a mouse, a keyboard, a touchscreen device, or a sensing device. In addition, FIG. 8 and FIG. 9 do not show an HPIB, that is, a bus that is used for communication between devices, that is accessed by using a bus end point, and that has a function similar to that of a wireless network.

It can be understood that, to implement the foregoing functions, the device or apparatus includes a corresponding hardware structure and/or software module for performing the functions. A person skilled in the art should be easily aware that, in combination with the examples described in embodiments disclosed in this specification, units, algorithms, and steps may be implemented by hardware or a combination of hardware and computer software in embodiments of this disclosure. Whether a function is performed by hardware or hardware driven by computer software depends on particular applications and design constraints of the technical solution. A person skilled in the art may use different methods to implement the described functions for each particular application, but it should not be considered that the implementation goes beyond the scope of embodiments of this disclosure.

In embodiments of this disclosure, the foregoing device (for example, 800 and 900) or the apparatus (for example, 600 and 700) may be divided into functional modules based on the foregoing method examples. For example, each function module may be obtained through division for a corresponding function, or two or more functions may be integrated into one processing module. The integrated module may be implemented in a form of hardware, or may be implemented in a form of a software functional module. It should be noted that, in embodiments of this disclosure, division into the modules is an example and is merely logical function division, and may be other division in an actual implementation.

An embodiment of this disclosure further provides a chip system, and the chip system is applied to the foregoing device. The chip system includes one or more interface circuits and one or more processors. The interface circuit and the processor are interconnected through a line. The interface circuit is configured to: receive a signal from a storage of a device, and send the signal to the processor. The signal includes computer instructions stored in a storage. When the processor executes the computer instructions, the foregoing device performs any method performed by the first node in the method embodiments, or performs any method performed by the second node in the method embodiments.

An embodiment of this disclosure further provides a computer storage medium. The computer storage medium includes computer instructions. When the computer instructions run on a device, the device is enabled to perform any method performed by the first node in the method embodiments or perform any method performed by the second node in the method embodiments.

An embodiment of this disclosure further provides a computer program product. When the computer program product runs on a computer, the computer is enabled to perform any method performed by the first node in the method embodiments or perform any method performed by the second node in the method embodiments.

The device, the chip system, the computer storage medium, or the computer program product provided in this disclosure are all used to perform the corresponding methods provided above. Therefore, for beneficial effects that can be achieved by the device, the chip system, the computer storage medium, or the computer program product, refer to beneficial effects in the corresponding methods provided above. Details are not described herein again.

Based on the descriptions of the implementations, a person skilled in the art may clearly understand that for the purpose of convenient and brief descriptions, division into the functional modules is merely used as an example for description. In an actual application, the functions can be allocated to different functional modules for an implementation based on a requirement. In other words, an inner structure of an apparatus is divided into different functional modules, to implement all or some of the foregoing described functions.

In the several embodiments provided in this disclosure, it should be understood that the disclosed apparatus and method may be implemented in another manner. For example, the described apparatus embodiment is merely an example. For example, division into the modules or units is merely logical function division. During actual implementation, another division manner may be used. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement, to achieve the objectives of the solutions of embodiments.

In addition, functional units in embodiments of this disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this disclosure essentially, or the part contributing to other technologies, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code such as a USB flash drive, a removable hard disk, a ROM, a RAM, a magnetic disk, or an optical disc.

The foregoing content is merely specific implementations of this disclosure, but is not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A method, comprising:

obtaining, based on a first virtual address, a physical address, wherein the first virtual address is in a first request, and wherein the first request requests to read data of a second node or write data to the second node; and sending, based on a first mapping relationship, a second request, wherein the first mapping relationship is between the physical address and a bus address, wherein the second request corresponds to the first request, wherein the second request comprises the bus address, wherein the bus address indicates a second virtual address corresponding to an instance of the second node by including an identifier of the instance, wherein the identifier of the instance is a name of the instance, a number of the instance, or a type identifier of the instance, and wherein the instance of the second node comprises a process or a thread being run by an operating system of the second node.

2. The method of claim 1, further comprising communicating with the second node based on the first mapping relationship.

3. The method of claim 2, wherein the physical address is in a physical address space corresponding to a bus end point of a first node.

4. The method of claim 1, wherein the bus address comprises a first identifier of a bus end point of the second node and a third virtual address, and wherein the third virtual address is related to the instance.

5. The method of claim 4, wherein the bus address further comprises a second identifier of the instance.

6. The method of claim 5, wherein the second identifier indicates a virtual address space corresponding to the instance.

7. The method of claim 1, further comprising storing a first mapping table, wherein the first mapping table indicates a plurality of mapping relationships comprising the first mapping relationship, and wherein each of the plurality of mapping relationships is mapping between a physical address and a bus address.

8. The method of claim 7, further comprising:
obtaining an address space of the second node, wherein the address space indicates at least one bus address; and
updating, based on the address space, the first mapping table to comprise at least one entry that corresponds to the at least one bus address.

9. A method, comprising:
receiving a request to read data in a second node or write data to the second node, wherein the request comprises a bus address, wherein the bus address indicates a first virtual address corresponding to an instance of the second node by including an identifier of the instance, wherein the identifier of the instance is a name of the instance, a number of the instance, or a type identifier of the instance, and wherein the instance of the second node comprises a process or a thread being run by an operating system of the second node; and
obtaining, based on the bus address and a second mapping relationship, a physical address that corresponds to the request and that is in a storage medium to perform an operation indicated by the request,
wherein the second mapping relationship is between the bus address and the physical address.

10. The method of claim 9, further comprising processing the request from a first node based on the second mapping relationship.

11. The method of claim 10, wherein the bus address comprises a first identifier of a bus end point and a second virtual address, and wherein the second virtual address is related to the instance.

12. The method of claim 11, wherein the second mapping relationship is between the second virtual address and the physical address.

13. The method of claim 12, further comprising storing a second mapping table, wherein the second mapping table indicates a plurality of mapping relationships comprising the second mapping relationship, and wherein each of the plurality of mapping relationships is mapping between a virtual address in the second node and a physical address corresponding to the virtual address in the second node.

14. The method of claim 13, further comprising:
obtaining an address allocation request of the instance, wherein the address allocation request indicates that the instance provides a physical address space corresponding to the instance; and
updating, based on the address allocation request, the second mapping table to comprise at least one entry that corresponds to the physical address space.

15. The method of claim 11, wherein the bus address further comprises a second identifier of the instance.

16. The method of claim 15, wherein the second identifier indicates a virtual address space corresponding to the instance, and wherein the physical address belongs to a physical address space corresponding to the instance.

17. The method of claim 15, wherein the second mapping relationship comprises a first mapping between the second identifier and a page table base address of the instance and a second mapping between the second virtual address and the physical address, and wherein the second mapping is recorded in a page table of the instance.

18. The method of claim 17, further comprising storing a third mapping table, wherein the third mapping table comprises a plurality of entries, wherein the first mapping is recorded in one of the plurality of entries, wherein each of the plurality of entries is used to record information about the instance, and wherein the information comprises the second identifier and the page table base address.

19. The method of claim 18, further comprising updating, based on information about the instance of the second node, the third mapping table to comprise an entry that corresponds to the information, wherein the information comprises the second identifier of the instance and the page table base address.

20. A computer device, comprising:
a non-transitory memory storage comprising instructions; and
one or more processors coupled to the non-transitory memory storage and configured to execute the instructions to:
obtain, based on a first virtual address, a physical address, wherein the first virtual address is in a first request, and wherein the first request requests to read data of a node or write data to the node; and
send, based on a first mapping relationship and to the node, a second request, wherein the first mapping relationship is between the physical address and a bus address,
wherein the second request corresponds to the first request,
wherein the second request comprises the bus address,
wherein the bus address indicates a second virtual address corresponding to an instance of the node by including an identifier of the instance,
wherein the identifier of the instance is a name of the instance, a number of the instance, or a type identifier of the instance, and
wherein the instance of the node comprises a process or a thread being run by an operating system of the node.

\* \* \* \* \*